United States Patent
Mochizuki et al.

(10) Patent No.: US 8,587,418 B2
(45) Date of Patent: Nov. 19, 2013

(54) METHOD OF CONTROLLING A COLLISION WARNING SYSTEM USING RIGHT OF WAY

(75) Inventors: Yutaka Mochizuki, Novi, MI (US); John L. Yester, Birmingham, MI (US)

(73) Assignee: Honda Motor Co., Ltd., Tokyo (JP)

( * ) Notice: Subject to any disclaimer, the term of this patent is extended or adjusted under 35 U.S.C. 154(b) by 627 days.

(21) Appl. No.: 12/845,092

(22) Filed: Jul. 28, 2010

(65) Prior Publication Data

US 2012/0025965 A1 Feb. 2, 2012

(51) Int. Cl.
*B60Q 1/00* (2006.01)

(52) U.S. Cl.
USPC ............ 340/435; 340/995.13; 340/441

(58) Field of Classification Search
USPC ......... 340/435, 436, 464, 438–439, 902–905, 340/917–919, 929, 932, 936, 995.13, 340/995.28, 441
See application file for complete search history.

(56) References Cited

U.S. PATENT DOCUMENTS

| | | | | |
|---|---|---|---|---|
| 5,307,060 A | * | 4/1994 | Prevulsky et al. | 340/902 |
| 5,339,075 A | * | 8/1994 | Abst et al. | 340/903 |
| 5,594,412 A | * | 1/1997 | Matsumoto | 340/435 |
| 5,663,706 A | * | 9/1997 | Francis | 340/464 |
| 5,979,586 A | * | 11/1999 | Farmer et al. | 180/274 |
| 6,370,475 B1 | | 4/2002 | Breed et al. | |
| 6,405,132 B1 | | 6/2002 | Breed et al. | |
| 6,526,352 B1 | | 2/2003 | Breed et al. | |
| 6,624,782 B2 | * | 9/2003 | Jocoy et al. | 342/70 |
| 6,720,920 B2 | | 4/2004 | Breed et al. | |
| 6,768,944 B2 | | 7/2004 | Breed et al. | |
| 7,005,977 B1 | | 2/2006 | Tengler et al. | |
| 7,085,637 B2 | | 8/2006 | Breed et al. | |
| 7,110,880 B2 | | 9/2006 | Breed et al. | |
| 7,202,776 B2 | | 4/2007 | Breed | |
| 7,418,346 B2 | | 8/2008 | Breed et al. | |
| 7,433,773 B2 | | 10/2008 | Tengler et al. | |
| 7,444,227 B2 | | 10/2008 | Tengler et al. | |
| 7,444,240 B2 | * | 10/2008 | Macneille et al. | 701/300 |
| 8,195,391 B2 | * | 6/2012 | Mittermaier | 701/410 |
| 2006/0095199 A1 | | 5/2006 | Lagassey | |
| 2007/0082658 A1 | | 4/2007 | Tengler et al. | |
| 2007/0087756 A1 | | 4/2007 | Hoffberg | |
| 2007/0244643 A1 | | 10/2007 | Tengler et al. | |
| 2008/0122605 A1 | | 5/2008 | Tengler et al. | |
| 2008/0122652 A1 | | 5/2008 | Tengler et al. | |
| 2008/0133136 A1 | | 6/2008 | Breed et al. | |
| 2008/0136670 A1 | | 6/2008 | Tengler et al. | |
| 2008/0161986 A1 | | 7/2008 | Breed | |
| 2008/0161987 A1 | | 7/2008 | Breed | |
| 2008/0167821 A1 | | 7/2008 | Breed | |
| 2009/0082949 A1 | * | 3/2009 | Petrie et al. | 701/119 |

FOREIGN PATENT DOCUMENTS

JP 2008021181 1/2008

* cited by examiner

*Primary Examiner* — Daniel Previl
(74) *Attorney, Agent, or Firm* — Plumsea Law Group, LLC

(57) ABSTRACT

A collision warning system for a motor vehicle is disclosed. The collision warning system includes a first mode and a second mode. The system operates in the first mode when the motor vehicle has right of way. The system operates in the second mode where the motor vehicle does not have right of way.

20 Claims, 14 Drawing Sheets

METHOD OF CONTROLLING A COLLISION WARNING SYSTEM USING RIGHT OF WAY

BACKGROUND OF THE INVENTION

1. Field of the Invention

The present invention relates to motor vehicles and in particular to a collision warning system for a motor vehicle.

2. Description of Related Art

Collision warning systems have been previously proposed. Collision warning systems can alert a driver to potential hazards posed by other vehicles or objects near or on a roadway. Some collision warning systems use visual and/or audible messages to alert a driver of potential collisions.

SUMMARY OF THE INVENTION

The invention discloses a method of controlling a collision warning system according to right of way conditions. The invention can be used in connection with a motor vehicle. The term "motor vehicle" as used throughout the specification and claims refers to any moving vehicle that is capable of carrying one or more human occupants and is powered by any form of energy. The term motor vehicle includes, but is not limited to: cars, trucks, vans, minivans, SUVs, motorcycles, scooters, boats, personal watercraft, and aircraft.

In some cases, the motor vehicle includes one or more engines. The term "engine" as used throughout the specification and claims refers to any device or machine that is capable of converting energy. In some cases, potential energy is converted to kinetic energy. For example, energy conversion can include a situation where the chemical potential energy of a fuel or fuel cell is converted into rotational kinetic energy or where electrical potential energy is converted into rotational kinetic energy. Engines can also include provisions for converting kinetic energy into potential energy. For example, some engines include regenerative braking systems where kinetic energy from a drivetrain is converted into potential energy. Engines can also include devices that convert solar or nuclear energy into another form of energy. Some examples of engines include, but are not limited to: internal combustion engines, electric motors, solar energy converters, turbines, nuclear power plants, and hybrid systems that combine two or more different types of energy conversion processes.

In one aspect, the invention provides a method of operating a collision warning system in a motor vehicle, comprising the steps of: receiving information related to a target vehicle; determining if the motor vehicle has right of way over the target vehicle; the collision warning system including multiple alert modes; operating the collision warning system in a normal alert mode when the motor vehicle has right of way over the target vehicle; operating the collision warning system in an enhanced alert mode when the target vehicle has right of way over the motor vehicle; and wherein the normal alert mode is different than the enhanced alert mode.

In another aspect, the invention provides a method of operating a collision warning system in a motor vehicle, comprising the steps of: receiving information related to a first roadway associated with the motor vehicle and receiving information related to a second roadway associated with a target vehicle; determining a first roadway characteristic from the information related to the first roadway and a second roadway characteristic from the information related to the second roadway; comparing the first roadway characteristic with the second roadway characteristic; determining a right of way condition of the motor vehicle; operating the collision warning system in a normal alert mode when the motor vehicle has right of way over the target vehicle; operating the collision warning system in an enhanced alert mode when the target vehicle has right of way over the motor vehicle; and wherein the normal alert mode is different than the enhanced alert mode.

In another aspect, the invention provides a method of operating a collision warning system in a motor vehicle, comprising the steps of: receiving information related to a target vehicle; determining if the motor vehicle has right of way over the target vehicle; the collision warning system including multiple alert modes; operating the collision warning system in a normal alert mode when the motor vehicle has right of way over the target vehicle; operating the collision warning system in an enhanced alert mode when the target vehicle has right of way over the motor vehicle; and wherein the collision warning system issues more alerts in the enhanced alert mode than in the normal alert mode.

Other systems, methods, features and advantages of the invention will be, or will become, apparent to one of ordinary skill in the art upon examination of the following figures and detailed description. It is intended that all such additional systems, methods, features and advantages included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION OF THE EXEMPLARY EMBODIMENTS

Figure 1:
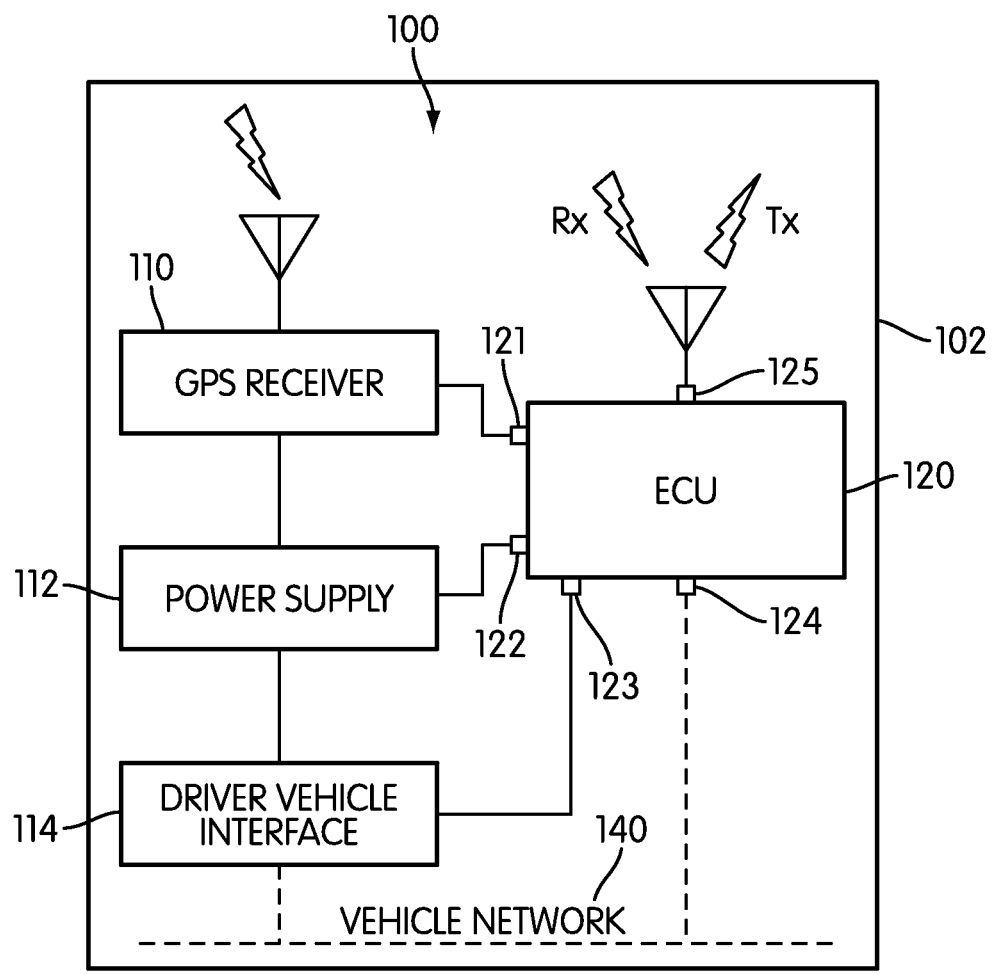
FIG. 1 is a schematic view of an embodiment of a collision warning system.

FIG. 1 is a schematic view of an embodiment of collision warning system 100 that is configured to be used within motor vehicle 102. Collision warning system 100 may be a system configured to detect potential collisions as well as to alert a driver or passenger to potential collisions. For purposes of clarity, only some components of a motor vehicle that may be relevant to collision warning system 100 are illustrated. Furthermore, in other embodiments, additional components can be added or removed.

Collision warning system 100 can include provisions for receiving GPS information. In some cases, collision warning system 100 can include GPS receiver 110. In an exemplary embodiment, GPS receiver 110 can be used for gathering GPS information for any systems of a motor vehicle, including, but not limited to: GPS based navigation systems.

Collision warning system 100 can include provisions for powering one or more devices. In some cases, collision warning system 100 can include power supply 112. Generally, power supply 112 can be any type of power supply associated with a motor vehicle. In some cases, power supply 112 can be a car battery. In other cases, power supply 112 can be another type of power supply available within motor vehicle 102.

Collision warning system 100 can include provisions for communicating with a driver. In some embodiments, collision warning system 100 can include driver vehicle interface 114. In some cases, driver vehicle interface 114 can include provisions for transmitting information to a driver and/or passenger. In other cases, driver vehicle interface 114 can include provisions for receiving information from a driver and/or passenger. In an exemplary embodiment, driver vehicle interface 114 can include provisions for transmitting and receiving information from a driver and/or passenger.

Motor vehicle 102 may include provisions for communicating, and in some cases controlling, the various components associated with collision warning system 100. In some embodiments, collision warning system 100 may be associated with a computer or similar device. In the current embodiment, collision warning system may include electronic control unit 120, hereby referred to as ECU 120. In one embodiment, ECU 120 may be configured to communicate with, and/or control, various components of collision warning system 100. In addition, in some embodiments, ECU 120 may be configured to control additional components of a motor vehicle that are not shown.

ECU 120 may include a number of ports that facilitate the input and output of information and power. The term "port" as used throughout this detailed description and in the claims refers to any interface or shared boundary between two conductors. In some cases, ports can facilitate the insertion and removal of conductors. Examples of these types of ports include mechanical connectors. In other cases, ports are interfaces that generally do not provide easy insertion or removal. Examples of these types of ports include soldering or electron traces on circuit boards.

All of the following ports and provisions associated with ECU 120 are optional. Some embodiments may include a given port or provision, while others may exclude it. The following description discloses many of the possible ports and provisions that can be used, however, it should be kept in mind that not every port or provision must be used or included in a given embodiment.

In some embodiments, ECU 120 can include first port 121 for communicating with GPS receiver 110. In particular, ECU 120 may be configured to receive GPS information from GPS receiver 110. In addition, ECU 120 can include second port 122 for receiving power from power supply 112. Also, ECU 120 can include third port 123 for communicating with driver vehicle interface 114. In particular, ECU 120 can be configured to transmit information to driver vehicle interface 114, as well as to receive information from driver vehicle interface 114.

A collision warning system can include provisions for communicating with one or more vehicles using a vehicle communication network. The term "vehicle communication network" as used throughout this detailed description and in the claims refers to any network utilizing motor vehicles and roadside units as nodes. Vehicle communication networks may be used for exchanging various types of information between motor vehicles and/or roadside units. In particular, a vehicle communication network may be used for both vehicle to vehicle (V2V) communication and vehicle to infrastructure (V2I) communication. An example of such a vehicular network is a dedicated short range communication (DSRC) network. In some cases, DSRC networks may be configured to operate in the 5.9 GHz band with bandwidth of approximately 75 MHz. Furthermore, DSRC networks may have a range of approximately 1000 m.

In some embodiments, ECU 120 may include fifth port 125 that is configured to communicate with one or more DSRC devices. In an exemplary embodiment, fifth port 125 may be associated with a DSRC antenna that is configured to transmit and/or receive vehicle information over one or more vehicle communication networks.

Collision warning system 100 can include provisions for communicating with one or more components of a motor vehicle that are not associated directly, or indirectly with collision warning system 100. In some cases, ECU 120 may include additional ports for communicating directly with one or more additional devices of a motor vehicle, including various sensors or systems of the motor vehicle. In an exemplary embodiment, ECU 120 may include fourth port 124 for communicating with onboard vehicle network 140. By providing communication between ECU 120 and onboard vehicle network 140, ECU 120 may have access to additional information concerning motor vehicle 102. For instance, in some cases, ECU 120 may be configured to receive information related to various operating conditions of a motor vehicle. Examples of information that may be received via onboard vehicle network 140 include, but are not limited to: vehicle speed, engine speed, braking conditions, as well as other parameters associated with the operating condition of motor vehicle 102.

A collision warning system can include provisions for controlling one or more systems in a motor vehicle that may be utilized during a collision, or that can be used to help avoid a collision. For example, in some embodiments, ECU 120 may be configured to communicate with a brake actuator to help control braking prior to, or during a collision. In other embodiments, ECU 120 may be configured to communicate with an electric seat belt pre-tensioner to help control a seat belt during a collision. In still other embodiments, any systems of a motor vehicle can be controlled using ECU 120. In some embodiments, ECU 120 can be configured with additional ports for communicating with other systems of a motor vehicle, including systems used during a collision. In other embodiments, ECU 120 can be configured to communicate with these systems using an onboard vehicle network. With this arrangement, a collision warning system can be configured to control one or more systems that may be used to help avoid a collision or to increase the safety of one or more occupants during a collision.

Figure 2:
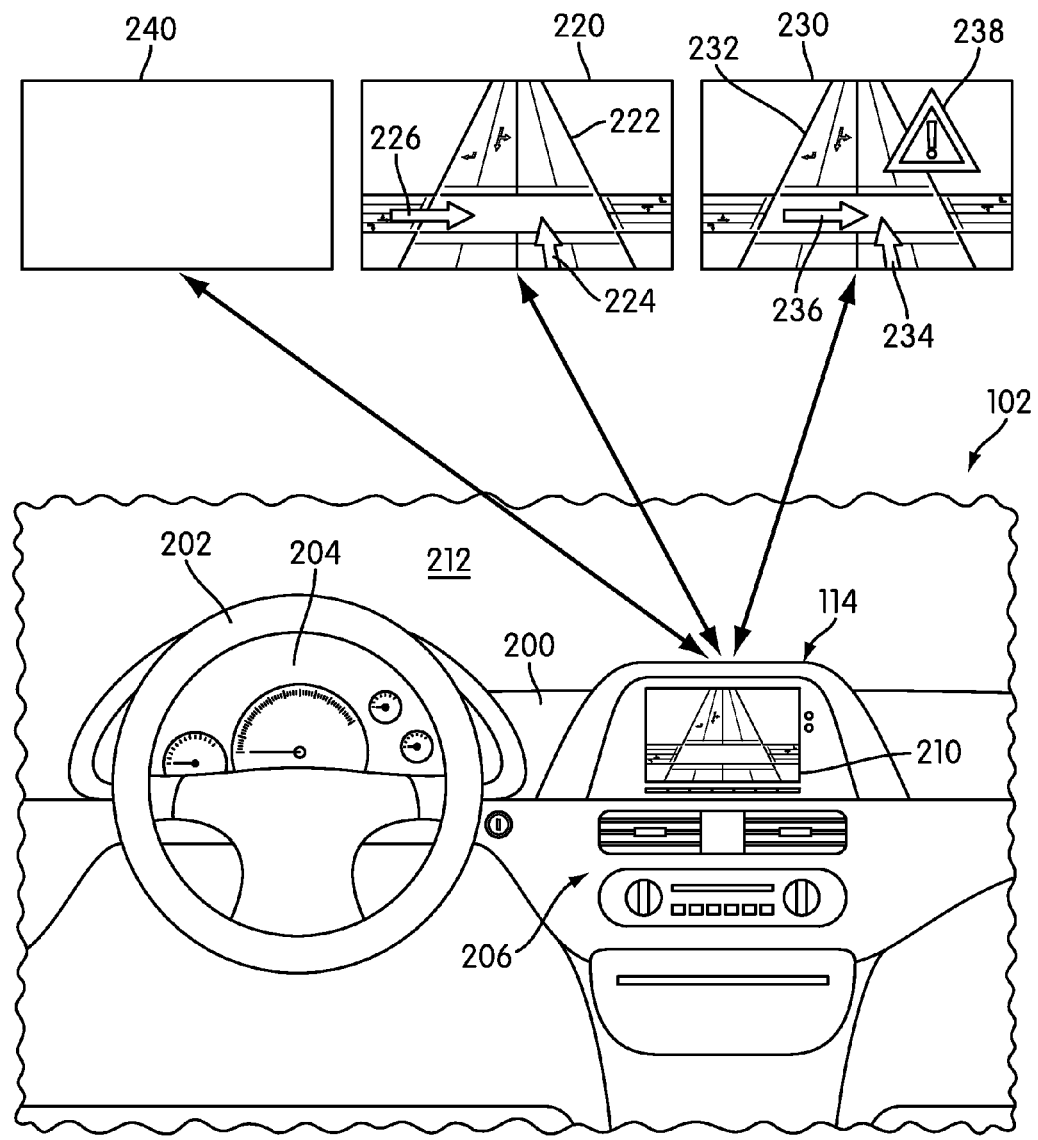
FIG. 2 is a schematic view of an embodiment of alert images for a collision warning system.

FIG. 2 illustrates an embodiment of dashboard 200 for motor vehicle 102. Dashboard 200 may include steering wheel 202 and instrument panel 204. In some embodiments, dashboard 200 can further include center portion 206. In some cases, center portion 206 can include one or more devices associated with an interior of a motor vehicle. Examples include, but are not limited to: audio devices, video devices, navigation devices, as well as any other types of devices. In addition, center portion 206 can be associated with controls for one or more systems of motor vehicle 102 including, but not limited to: climate control systems and other types of systems.

A motor vehicle can include provisions for displaying information from a collision warning system. In some embodiments, a motor vehicle can include a display device of some kind. In some cases, a motor vehicle can include a video screen for displaying information from a collision warning system. Examples of display devices include, but are not limited to: LCDs, CRTs, ELDs, LEDs, OLEDs, as well as other types of displays. In other cases, a display device could be a projection type display device that is configured to project an image onto one or more surfaces of motor vehicle 102. It will be understood that a display device may not be limited to a video screen or projection type display device.

In one embodiment, motor vehicle 102 can include display device 210. In some cases, display device 210 may be associated with driver vehicle interface 114 of collision warning system 100. In particular, display device 210 may be configured to present visual information received from collision warning system 100. In an exemplary embodiment, display device 210 may be an LCD screen.

In some embodiments, display device 210 can be disposed within center portion 206. However, it will be understood that in other embodiments, display device 210 can be located in any portion of motor vehicle 102 as long as display device 210 can be viewed by a driver. For example, in another embodiment, display device 210 may be a projection type device that displays an image onto front window 212. In addition, while display device 210 can be configured to present visual information received from collision warning system 100, display device 210 may be shared with other devices or systems within motor vehicle 100. For example, display device 210 could also be used as a screen for a navigation system.

It will be understood that in some embodiments, a driver vehicle interface can include additional provisions beyond a display screen. For example, in another embodiment, a driver vehicle interface can also be associated with one or more input devices that allow a driver to control various aspects of a collision warning system. In some cases, a driver vehicle interface can include an on/off button for turning a collision warning system on and off. In still another embodiment, a driver vehicle interface can be associated with speakers for generating auditory information.

A display device for a collision warning system can be configured to display one or more images associated with various types of alerts of the collision warning system. For purposes of clarity, the following detailed description discusses a collision warning system utilizing two distinct alert types: informing alerts and warning alerts. In particular, informing alerts are used to inform a driver of nearby vehicles or objects that could pose potential problems at a later time. In contrast, a warning alert may be issued to warn the driver of a serious threat of collision with a nearby vehicle or object. In other words, informing alerts inform a driver of low level collision threats, while warning alerts inform a driver of high level collision threats. In other embodiments, any other number of alert types can be used. In some cases, three or more alert types could be issued by a collision warning system.

In the exemplary embodiment, collision warning system 100 includes informing alert image 220 that is associated with an informational alert. Informing alert image 220 may comprise one or more symbols or icons. In this embodiment, informing alert image 220 includes intersection symbol 222, which indicates an upcoming intersection. In addition, informing alert image 220 includes first arrow 224 and second arrow 226, representing the general location and heading of motor vehicle 102 and an approaching vehicle for which there may some threat of collision. By displaying informing alert image 220, a driver is alerted to a potential collision threat with an approaching vehicle. This information may help a driver to be more aware as motor vehicle 102 approaches the upcoming intersection.

In the exemplary embodiment, collision warning system 100 also includes warning alert image 230 that is associated with a warning alert. Warning alert image 230 may comprise one or more symbols or icons. In a similar manner to informing alert image 220, warning alert image 230 may include intersection symbol 232, first arrow 234 and second arrow 236. These symbols indicate information about an upcoming intersection as well as the speeds and headings of motor vehicle 102 and an approaching vehicle. In addition, warning alert image 230 includes warning symbol 238. The appearance of warning symbol 238 alerts a driver to an immediate threat posed by an approaching vehicle. This information may help a driver to avoid a collision by taking immediate action.

In addition to the two types of alerts discussed above, a display device may be configured to display no image when no alert has been issued by collision warning system 100. In this embodiment, display device 210 displays default screen 240 when no alert is issued. In the exemplary embodiment, default screen 240 is associated with a blank screen of display device 210. However, in embodiments where display device 210 is used for displaying information from other systems, default screen 240 may not be a blank screen. For example, in embodiments where display device 210 is shared between a navigational system and collision warning system 100, display device 210 may continue to display images received from the navigation system until an alert is issued. Likewise, once an alert has expired, display device 240 may return to displaying images from a navigation system.

Although a single image is shown for each type of alert (informing alerts and warning alerts) in the current embodiment, other embodiments can include more than one image for each type of alert. In particular, an arrow used to indicate position and heading of a vehicle can be changed from a straight arrow indicating the intention of a vehicle to pass straight through an intersection to curved arrows in cases where the intention of the vehicle is to turn at the intersection. This arrangement can help to inform a driver as to the intentions of an approaching vehicle. In addition, a three way intersection symbol can be used in place of a four way intersection symbol in cases where the upcoming intersection is a three way intersection. However, in embodiments using multiple images for each type of alert, it will be understood that some distinguishing elements may be used to indicate that an alert is an informing alert or a warning alert. For example, as in the current embodiment, a warning symbol can be used to distinguish between informing alerts and warning alerts. Likewise, in some cases, informing alerts can be associated with a different color than warning alerts. In one embodiment, informing alerts can include symbols or icons colored in yellow, while warning alerts can include symbols or icons colored in red.

FIGS. 3 through 6 illustrate embodiments of a collision warning system in use. As previously discussed, motor vehicle 102 includes collision warning system 100. In particular, motor vehicle 102 includes provisions for communicating with one or more vehicles using a vehicle communication network. Also, motor vehicle 102 includes provisions for alerting a driver of potential collisions using either informing alerts or warning alerts.

Figure 3:
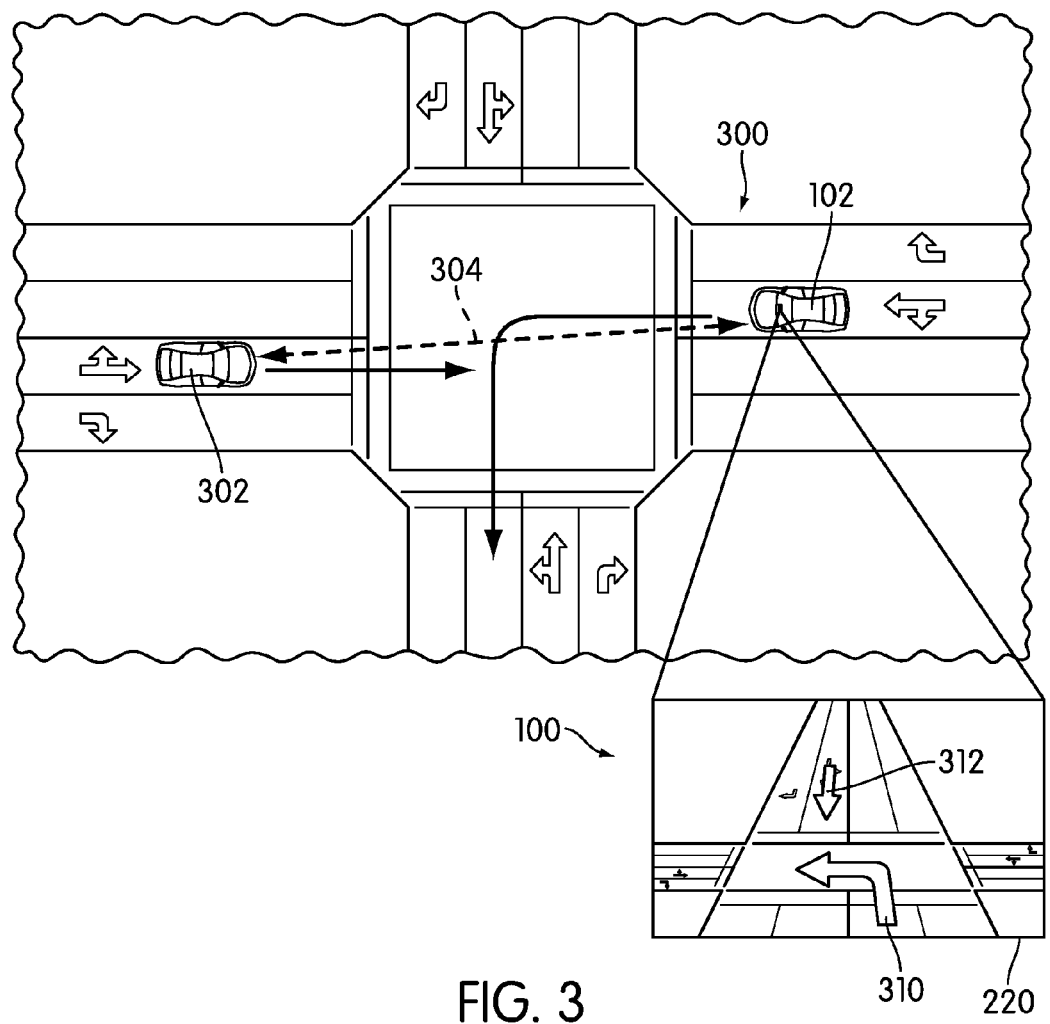
FIG. 3 is a schematic view of an embodiment of a collision warning system displaying an informing alert image.

Referring to FIG. 3, motor vehicle 102 is in communication with target vehicle 302 using vehicle communication network 304. The term "target vehicle" as used throughout this detailed description and in the claims refers to any vehicle about which a collision warning system could issue an alert. Furthermore, for clarity, a vehicle possessing a collision warning system may be referred to as a "subject vehicle", in contrast to the target vehicle. In particular, motor vehicle 102 is the subject vehicle in this embodiment.

In some cases, vehicle communication network 304 may be a DSRC network, as discussed above. In particular, using vehicle communication network 304, motor vehicle 102 and target vehicle 302 may be configured to exchange various types of information including, but not limited to: vehicle position, vehicle speed, vehicle heading as well as other types of vehicle information. In addition, any type of basic safety message (BSM) can be exchanged via vehicle communication network 304.

In an exemplary embodiment, each vehicle associated with vehicle communication network 304 is presumed to have a GPS antenna to determine vehicle locations. Using vehicle location information, velocities and headings for each vehicle can also be computed. In some cases, target vehicle 302 may simply transmit a current GPS position and motor vehicle 102 may calculate speed and heading according to the current GPS position. In other cases, target vehicle 302 can transmit each of these values independently.

In this embodiment, after receiving attributes from target vehicle 302, collision warning system 100 may determine if an alert should be issued. Since motor vehicle 102 is planning to make a left turn at intersection 300 and target vehicle 302 is planning to pass straight through intersection 300, there is potentially a threat of collision. In this case, collision warning system 100 issues an informing alert using informing alert image 220. Informing alert image 220 may include first arrow 310 and second arrow 312, indicating the planned trajectories of motor vehicle 102 and target vehicle 302, respectively. By displaying informing alert image 220, collision warning system 100 can inform a driver of motor vehicle 102 to a potential threat posed by target vehicle 302.

Figure 4:
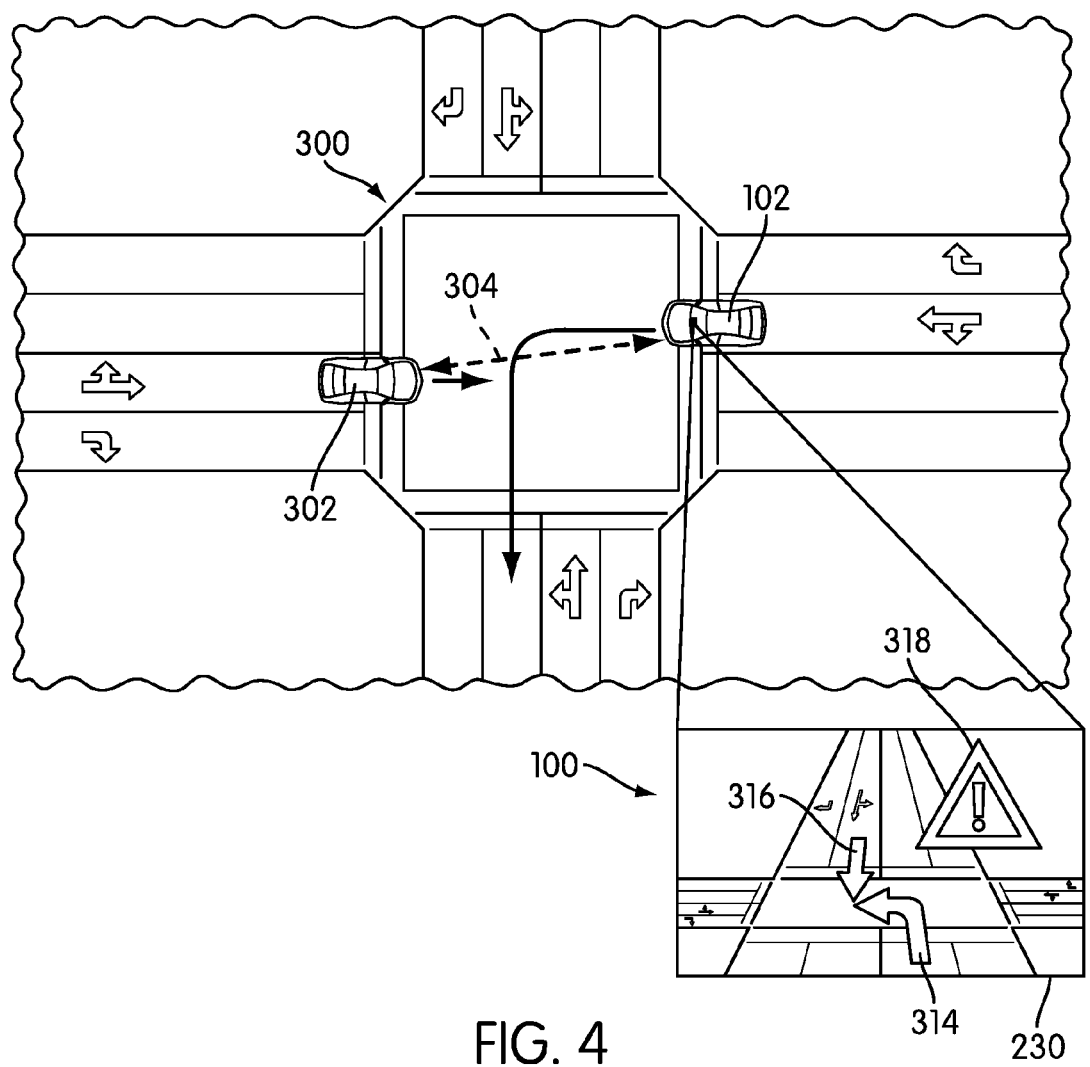
FIG. 4 is a schematic view of an embodiment of a collision warning system displaying a warning alert image.

Referring to FIG. 4, at a later time, target vehicle 302 is just about to enter intersection 300. At this point, collision warning system 100 may determine that the threat of collision is very high. In this case, collision warning system 100 issues a warning alert using warning alert image 230. Warning alert image 230 includes first arrow 314 and second arrow 316, indicating the planned trajectories of motor vehicle 102 and target vehicle 302, respectively. In contrast to the informing alert image illustrated in FIG. 3, warning alert image 230 also includes warning symbol 318, which indicates a serious threat of collision. By displaying warning alert image 230, collision warning system 100 can warn the driver of motor vehicle 102 to a serious collision threat posed by target vehicle 302. This warning may allow the driver to alter the current planned trajectory in order to avoid a collision.

In some cases, a driver may feel that a collision warning system issues too many alerts, especially informing alerts which may inform the driver about situations already known to the driver. For example, in situations where a driver has right of way over a target vehicle, an informing alert displaying the location and trajectory of the target vehicle may be seen as a nuisance. Some drivers may choose to deactivate a collision warning system rather than put up with these "nuisance alerts."

A collision warning system can include provisions for reducing the number of alerts issued to a driver. In some embodiments, a collision warning system can be configured to prevent informing alerts from being issued when a driver has right of way over a target vehicle. In some cases, a collision warning system can be configured to operate in two or more alert modes. A first alert mode may be used when the driver has right of way over a target vehicle. A second alert mode may be used when the target vehicle has right of way. In an exemplary embodiment, the first alert mode may be referred to as a normal alert mode. The second alert mode may be referred to as an enhanced alert mode. Furthermore, during the normal alert mode, a collision warning system may issue less warnings since a driver has right of way. In contrast, the enhanced alert mode may be associated with a higher frequency of issued alerts, since the driver does not have right of way, and thus could benefit from additional information to avoid potential collisions. However, in other embodiments, the number of alerts issued using the normal alert mode and the enhanced alert mode could be substantially similar.

Referring to FIGS. 3 and 4, motor vehicle 102 is preparing to make a left hand turn at intersection 300, while target vehicle 302 is planning to pass straight through intersection 300. Because of this arrangement, target vehicle 302 has right of way. In other words, motor vehicle 102 should yield to target vehicle 302 before proceeding with making a left hand turn. In this situation, collision warning system 100 is operated in the enhanced alert mode. In particular, as discussed above, displaying informing alert image 220 gives a driver useful information about target vehicle 302 that is not considered a nuisance. In addition, as target vehicle 302 gets closer to intersection 300, collision warning system 100 issues warning alert image 230, since the threat of collision is greatly increased with both vehicles entering intersection 300.

Figure 5:
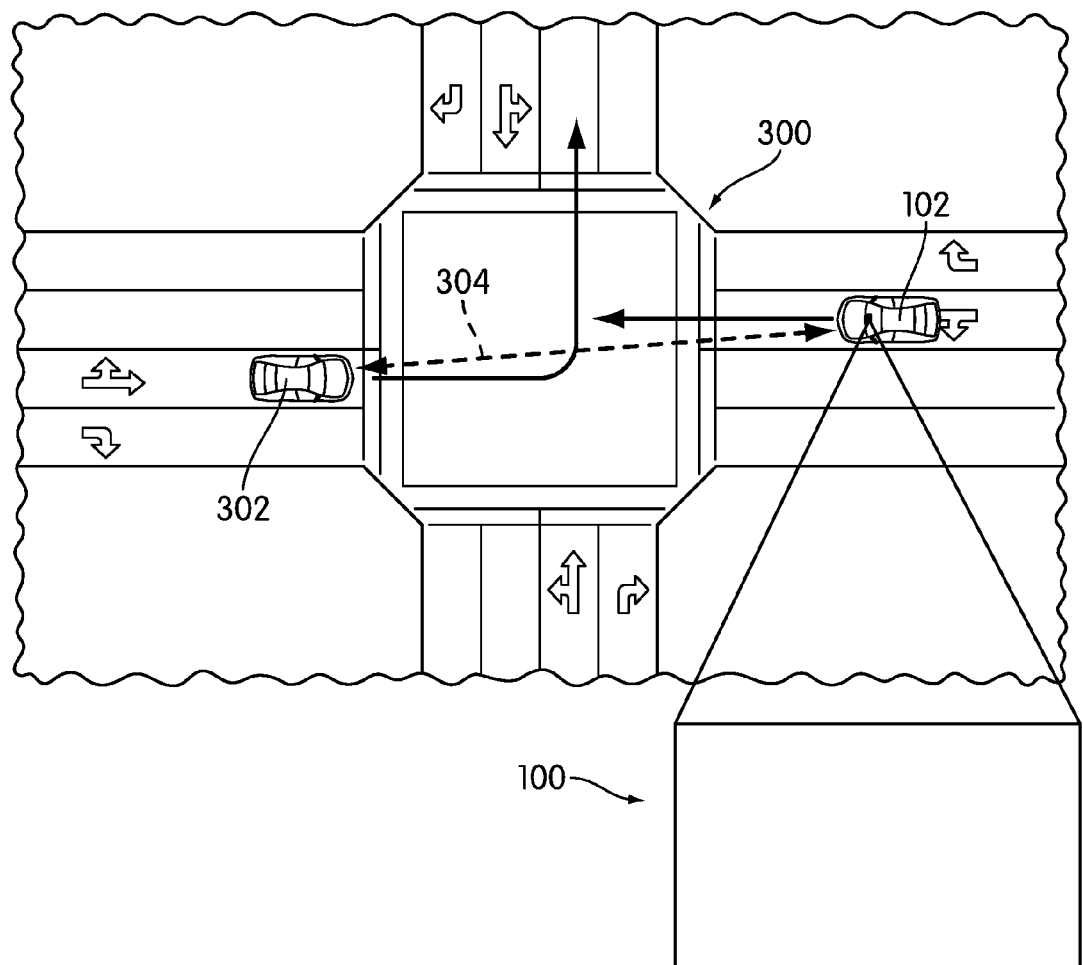
FIG. 5 is a schematic view of an embodiment of a collision warning system displaying a default screen.
Figure 6:
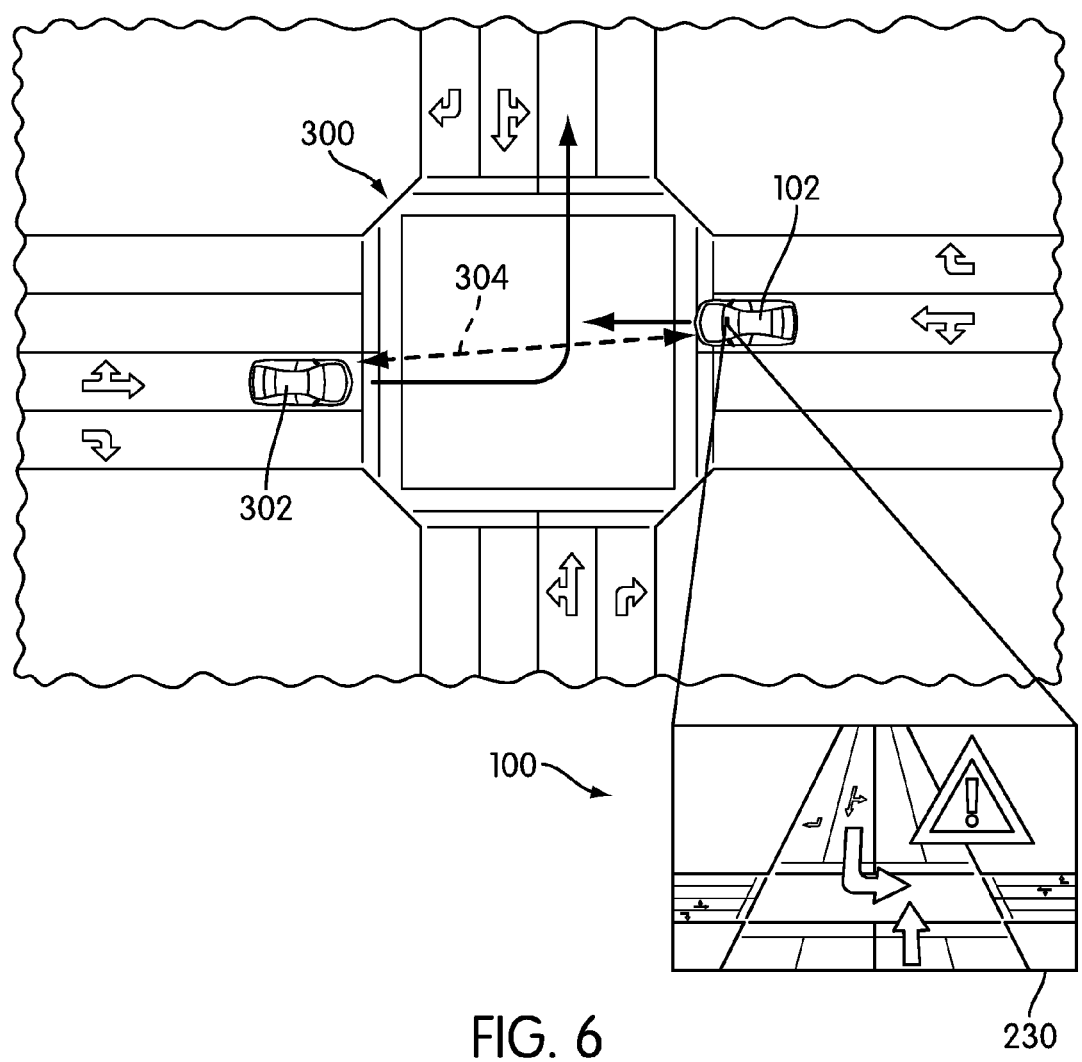
FIG. 6 is a schematic view of an embodiment of a collision warning system displaying a warning alert image.

In contrast, FIGS. 5 and 6 illustrate embodiments of collision warning system 100 operating in a normal alert mode. In this case, motor vehicle 102 is planning to pass straight through intersection 300, while target vehicle 302 is planning to turn left. In particular, motor vehicle 102 has right of way over target vehicle 302. In this situation, collision warning system 100 may determine that no informing alert is necessary since motor vehicle 102 has right of way. In the exemplary embodiment, default screen 240 is shown on a display screen associated with collision warning system 100.

As seen in FIG. 6, as target vehicle 302 enters intersection 300, collision warning system 100 may determine that the threat of a collision is very high. Therefore, at this point, collision warning system 100 may issue warning alert image 230 even though the driver has right of way over target vehicle 302.

With the arrangement discussed here, the number of alerts issued by a collision warning system can be modified according to the line of sight conditions. In particular, during normal alert mode, the collision warning system only issues warning alerts. In other words, the collision warning system only issues alerts when the threat of collision is high. In contrast, during the enhanced alert mode, the collision warning system may issue both informing alerts and warning alerts. This arrangement can help prevent deactivation of a collision warning system from annoyed drivers.

As discussed above, communications between two vehicles can be established using direct paths as well as reflection wave paths or diffraction wave paths. In particular, direct paths for signals associated with a vehicle communication network may be used when two vehicles have line of sight of one another. In addition, reflection wave paths or diffraction wave paths for signals associated with a vehicle communication network may be used when there is not good line of sight between vehicles, since a direct path may be obstructed by one or more objects in such cases. With this arrangement, a vehicle communication network can be established during both good line of sight conditions and non-line of sight conditions.

Figure 7:
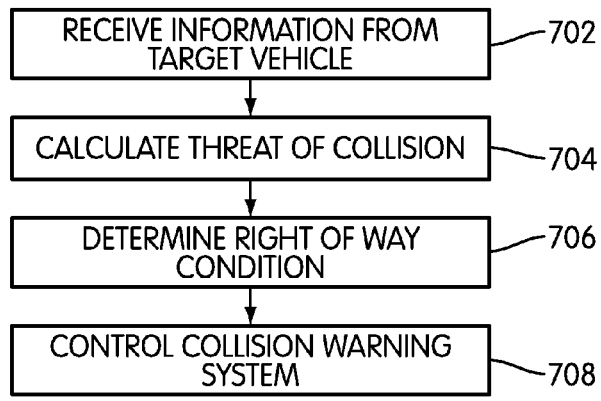
FIG. 7 is an embodiment of a process for controlling a collision warning system.

FIG. 7 illustrates an embodiment of a process for operating a collision warning system. In this embodiment, the following steps may be performed by ECU 120; however in some embodiments these steps may be performed by additional systems or devices associated with motor vehicle 102 and/or collision warning system 100. In addition, it will be understood that in other embodiments one or more of the following steps may be optional.

During step 702, ECU 120 may receive information from a target vehicle. In some cases, the information can be received from a vehicle communication network, such as a DSRC network. The information can include, in some cases, the location, speed and heading of the target vehicle. In other cases, additional information about the target vehicle can be received, including vehicle make, vehicle model, size information, shape information as well as other types of information about the target vehicle.

Next, during step 704, ECU 120 can calculate the threat of a collision. In some embodiments, the threat of collision can be associated with two or more discrete threat levels. In some cases, the threat of collision can be associated with "no threat," "low threat" or "high threat" levels. In other cases, the threat of collision can be associated with additional threat levels. In other embodiments, the threat of collision can be associated with a continuous value. For example, the threat of collision can be a value between 0 and 100, with 0 being no threat and 100 being the highest threat level. For purposes of clarity, the following detailed description discusses an embodiment utilizing the three discrete threat levels discussed above.

Following step 704, ECU 120 can proceed to step 706. During step 706, ECU 120 can determine right of way conditions for the driver of the motor vehicle. In particular, during step 706, ECU 120 can determine that the driver has right of way over the target vehicle or that the driver does not have right of way over the target vehicle.

Finally, during step 708, ECU 120 can control the collision warning system. In some cases, ECU 120 can use the threat of a collision and right of way conditions to determine whether or not to issue an alert as well as to determine what type of alert to issue.

Figure 8:
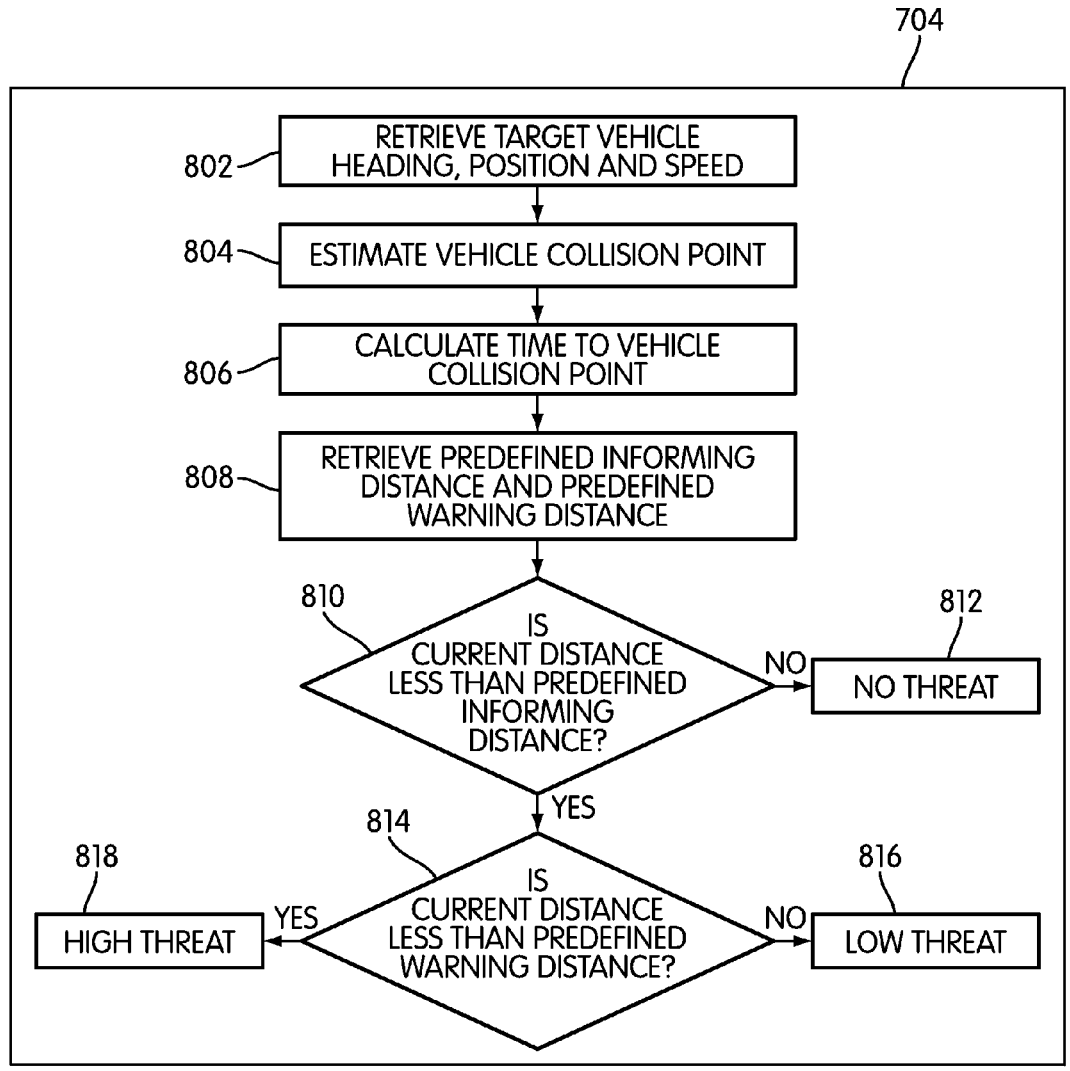
FIG. 8 is an embodiment of a process for calculating a threat of collision between a motor vehicle and a target vehicle.

FIG. 8 illustrates an embodiment of a process for calculating the threat of collision. In this embodiment, the following steps may be performed by ECU 120; however in some embodiments these steps may be performed by additional systems or devices associated with motor vehicle 102 and/or collision warning system 100. In addition, it will be understood that in other embodiments one or more of the following steps may be optional.

During step 802, ECU 120 can retrieve the heading, position and speed of a target vehicle using a vehicle communication network. Next, during step 804, ECU 120 may estimate a vehicle collision point. The term "vehicle collision point" refers to a point at which the motor vehicle and the target vehicle would collide given current headings, positions and speeds for both vehicles. In addition, ECU 120 may use other available information for estimating a vehicle collision point, such as the intention of one or both drivers to turn at an upcoming intersection.

Following step 804, ECU 120 may proceed to step 806. During step 806, ECU 120 may calculate the distance to the vehicle collision point. At this point, ECU 120 proceeds to step 808. During step 808, ECU 120 retrieves a predefined informing distance and a predefined warning distance. In other words, the predefined informing distance is a distance from the vehicle collision point within which the collision warning system may determine that there is a low threat of collision. Likewise, the predefined warning distance is a distance from the vehicle collision point within which the collision warning system may determine that there is a high threat of collision.

Following step 808, ECU 120 may proceed to step 810. During step 810, ECU 120 may determine if the current distance to the vehicle collision point is less than the predefined informing distance. If ECU 120 determines that the current distance to the vehicle collision point is not less than the predefined informing distance, ECU 120 may proceed to step 812, where ECU 120 determines that there is no threat. Otherwise, ECU 120 proceeds to step 814.

During step 814, ECU 120 determines if the current distance to the vehicle collision point is less than the predefined warning distance. If ECU 120 determines that the current distance to the vehicle collision point is not less than the predefined warning distance, ECU 120 may proceed to step 816. During step 816, ECU 120 determines that there is a low threat level. If, during step 814, ECU 120 determines that the current distance to the vehicle collision point is less than the predefined warning distance, ECU 120 proceeds to step 818. During step 818, ECU 120 determines that there is a high threat level.

It will be understood that the current embodiment of a process for determining a threat of collision is only intended to be exemplary. Generally, any method of determining a threat level according to information related to a primary vehicle and a target vehicle may be used. In other embodiments, a collision warning system can use another process for determining a threat of collision. For example, in another embodiment, rather than calculating a distance to the vehicle collision point, a time to vehicle collision point can be calculated and compared with a predefined informing alert time as well as a predefined warning alert time.

A collision warning system can include provisions for preventing alerts from being issued under some circumstances. In some cases, a collision warning system can prevent alerts from being issued when a motor vehicle is stopped. In other cases, a collision warning system can prevent alerts from being issued in situations where a driver may over-trust the system.

Figure 9:
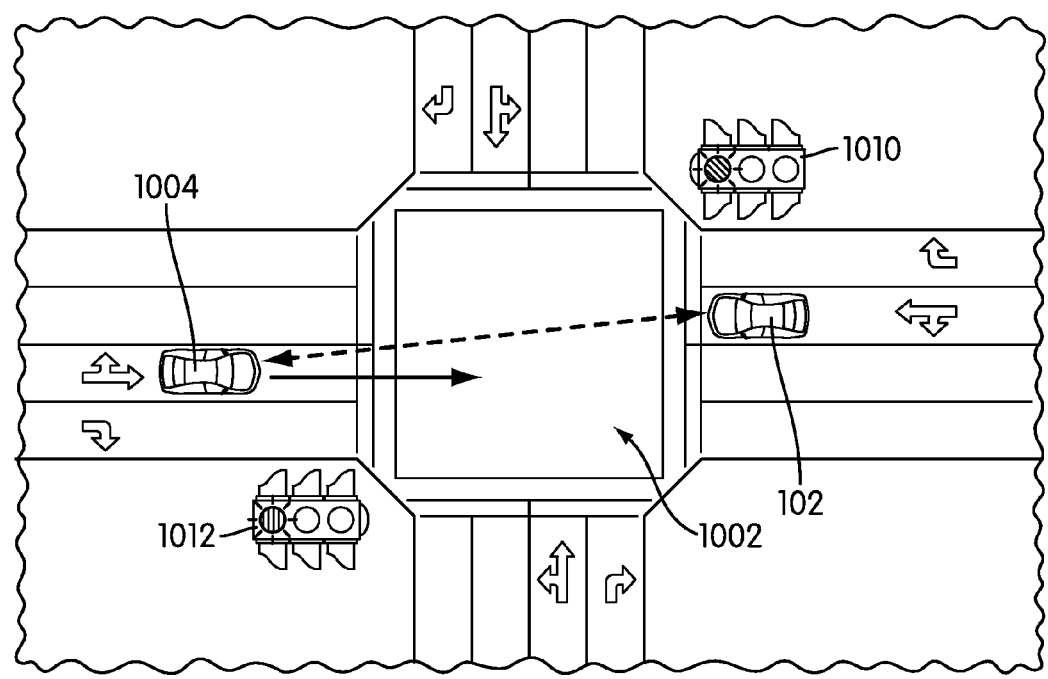
FIG. 9 is a schematic view of an embodiment of a motor vehicle stopped at an intersection.

Referring to FIG. 9, motor vehicle 102 is stopped at intersection 1002 since first traffic signal 1010 is displaying a red light. Furthermore, target vehicle 1004 is preparing to pass through intersection 1002, since second traffic signal 1012 is displaying a green light. In this situation, the threat of a collision between motor vehicle 102 and target vehicle 1004 is very low. In an exemplary embodiment, the collision warning system may be configured to prevent any alerts from being issued as long as motor vehicle 102 remains stopped.

Figure 10:
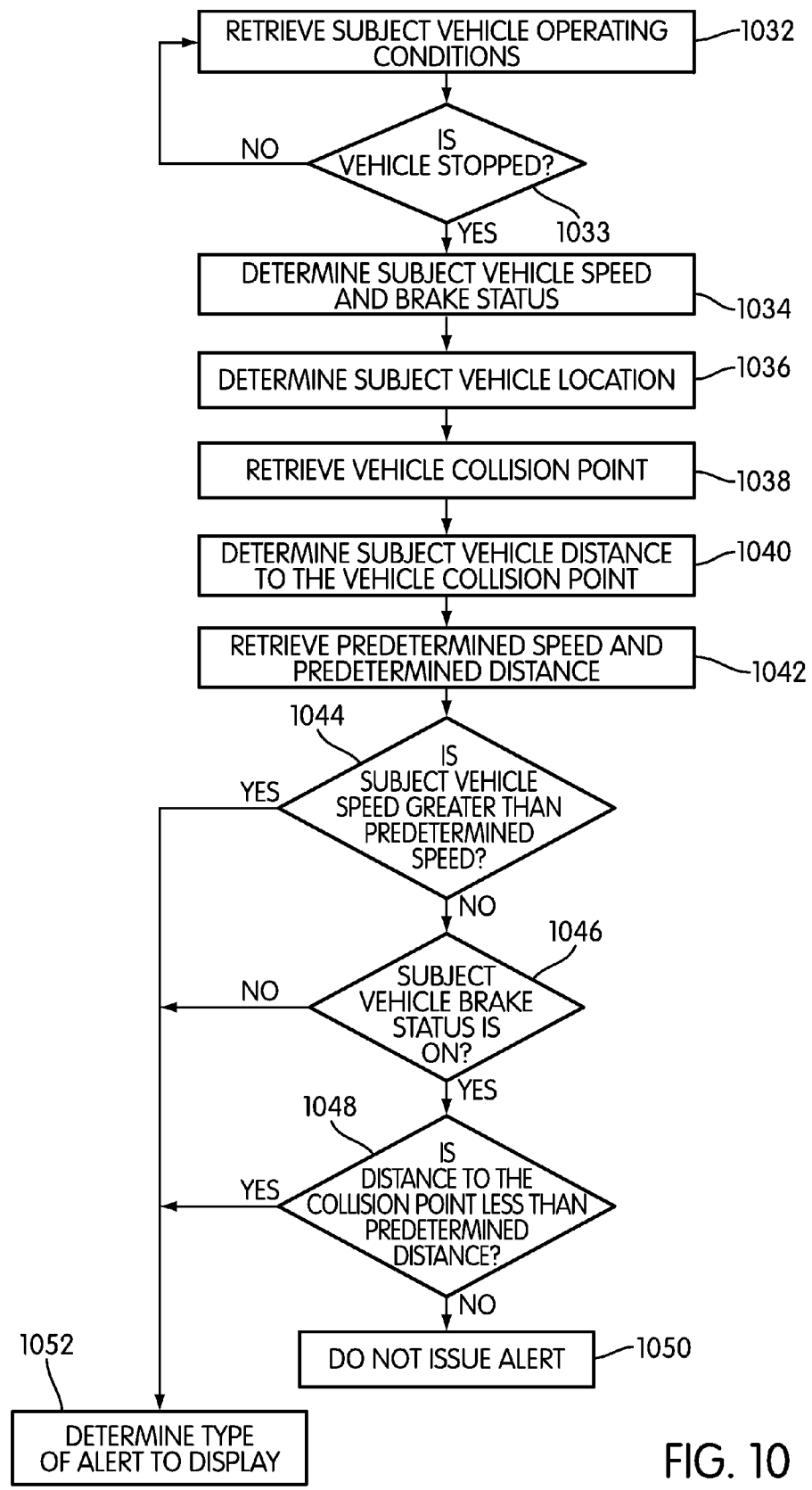
FIG. 10 is an embodiment of a process for controlling a collision warning system.

FIG. 10 illustrates an embodiment of a process for determining if any type of alert should be issued when a motor vehicle is stopped, such as at a traffic light. In this embodiment, the following steps may be performed by ECU 120; however in some embodiments these steps may be performed by additional systems or devices associated with motor vehicle 102 and/or collision warning system 100. In addition, it will be understood that in other embodiments one or more of the following steps may be optional.

During first step 1032, ECU 120 may receive one or more vehicle operating conditions. As previously discussed, as ECU 120 is connected to an internal or onboard vehicle network (see FIG. 1), ECU 120 may receive information from various systems, sensors, or other devices associated with motor vehicle 102. In particular, ECU 120 may receive information from a vehicle speed sensor and a brake sensor.

Following step 1032, ECU 120 may proceed to step 1033. During step 1033, ECU 120 may determine if the subject vehicle is stopped. If the subject vehicle is stopped, ECU 120 may proceed to step 1034. If, during step 1033, ECU 120 determines that the subject vehicle is not stopped, ECU 120 may return back to step 1032. In other words, ECU 120 may only perform the remaining steps in the process when the vehicle is stopped.

During step 1034, ECU 120 can determine a vehicle speed and brake status of the subject vehicle. Following step 1034, ECU 120 may proceed to step 1036. During step 1036, ECU 120 may determine a current location. In some cases, ECU 120 may receive information form a GPS receiver to determine the current location. Next, during step 1038, ECU 120 may retrieve a vehicle collision point that has been determined during step 804 of the process discussed above.

Following step 1038, ECU 120 may determine the distance of the subject vehicle to the vehicle collision point during step 1040. In some embodiments, during step 1038, ECU 120 may determine both the subject vehicle distance and the target vehicle distance to the vehicle collision point. Following this, ECU 120 may retrieve a predetermined speed and a predetermined distance during step 1042. Generally, the predetermined speed can have any value. In some cases, the predetermined speed may be a threshold speed that is used to determine whether or not a driver intends to start the vehicle from a stopped position. In cases where the vehicle speed is below the predetermined speed, the collision warning system may not issue alerts. In addition, the predetermined distance could be a threshold distance to the vehicle collision point. In other words, if a vehicle is farther from the vehicle collision point than the predetermined distance the threat of collision may be very low. In such cases, the collision warning system may not issue alerts.

Following step 1042, ECU 120 may proceed to step 1044. During step 1044, ECU 120 may determine if the subject vehicle speed is greater than the predetermined speed. If so, ECU 120 may proceed to step 1052, where ECU 120 determines the type of alert to display. Otherwise, ECU 120 may proceed to step 1046. During step 1046, ECU 120 may determine if the brake status of the vehicle is on. In other words, ECU 120 may determine if the subject vehicle is braking. If the vehicle is braking, ECU 120 may proceed to step 1048, otherwise ECU 120 may proceed to step 1052. With this arrangement, step 1044 and step 1046 may be used to determine if a driver has any intention of starting the vehicle once the vehicle has stopped.

Following step 1046, ECU 120 may proceed to step 1048 to determine if the distance to the vehicle collision point is less than the predetermined distance. In embodiments where ECU 120 determined both a subject vehicle distance and a target vehicle distance to the vehicle collision point during step 1040, ECU 120 may determine if both the subject vehicle distance and the target vehicle distance are below the predetermined distance. In other words, ECU 120 may determine if both the subject vehicle and the target vehicle are sufficiently close to the vehicle collision point. If so, ECU 120 may proceed to step 1052, otherwise ECU 120 may proceed to step 1050. During step 1050, ECU 120 determines that no alert is necessary, since the motor vehicle is currently stopped and the driver has no intention of starting again soon, as determined during step 1044 and step 1046. Furthermore, no alert is necessary because the vehicle is not close to a potential vehicle collision point, as determined during step 1048.

Figure 11:
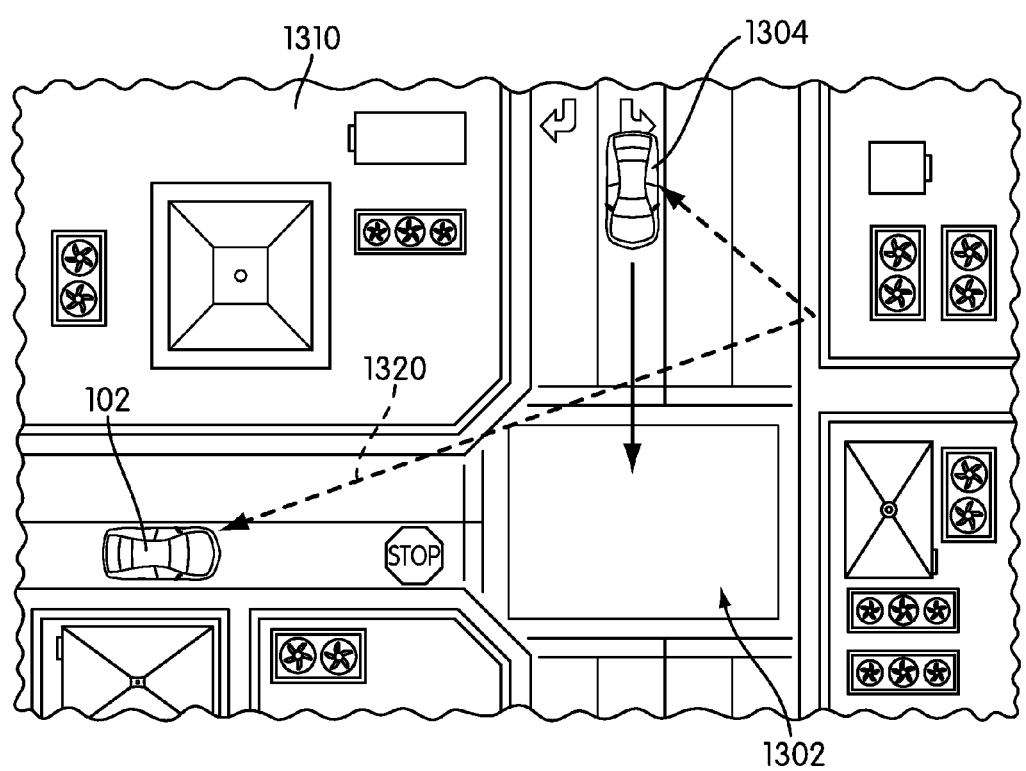
FIG. 11 is a schematic view of an embodiment of a motor vehicle slowing down at an intersection.

Referring to FIG. 11, motor vehicle 102 is approaching intersection 1302. Likewise, target vehicle 1304 is also approaching intersection 1302. In this case, building 1310 may obstruct the view of target vehicle 1304. In other words, a driver in motor vehicle 102 may not be able to see target vehicle 1304. In some embodiments, a collision warning system may be configured to detect target vehicle 1304 and alert a driver to any potential collisions, even though there is no line of sight. In particular, vehicle communication network 1320 may be established using a reflected wave path. In this situation, a driver may be overly dependent on a collision warning system. For example, in some cases, a driver may rely only on alerts to determine if another vehicle is approaching the intersection when there is no line of sight, rather than coming to a stop and visually confirming the presence of any approaching vehicles. In these situations, the driver may develop an over trust of the system. In one embodiment, in order to limit over trust, the collision warning system may issue alerts only when the driver intends to stop.

Figure 12:
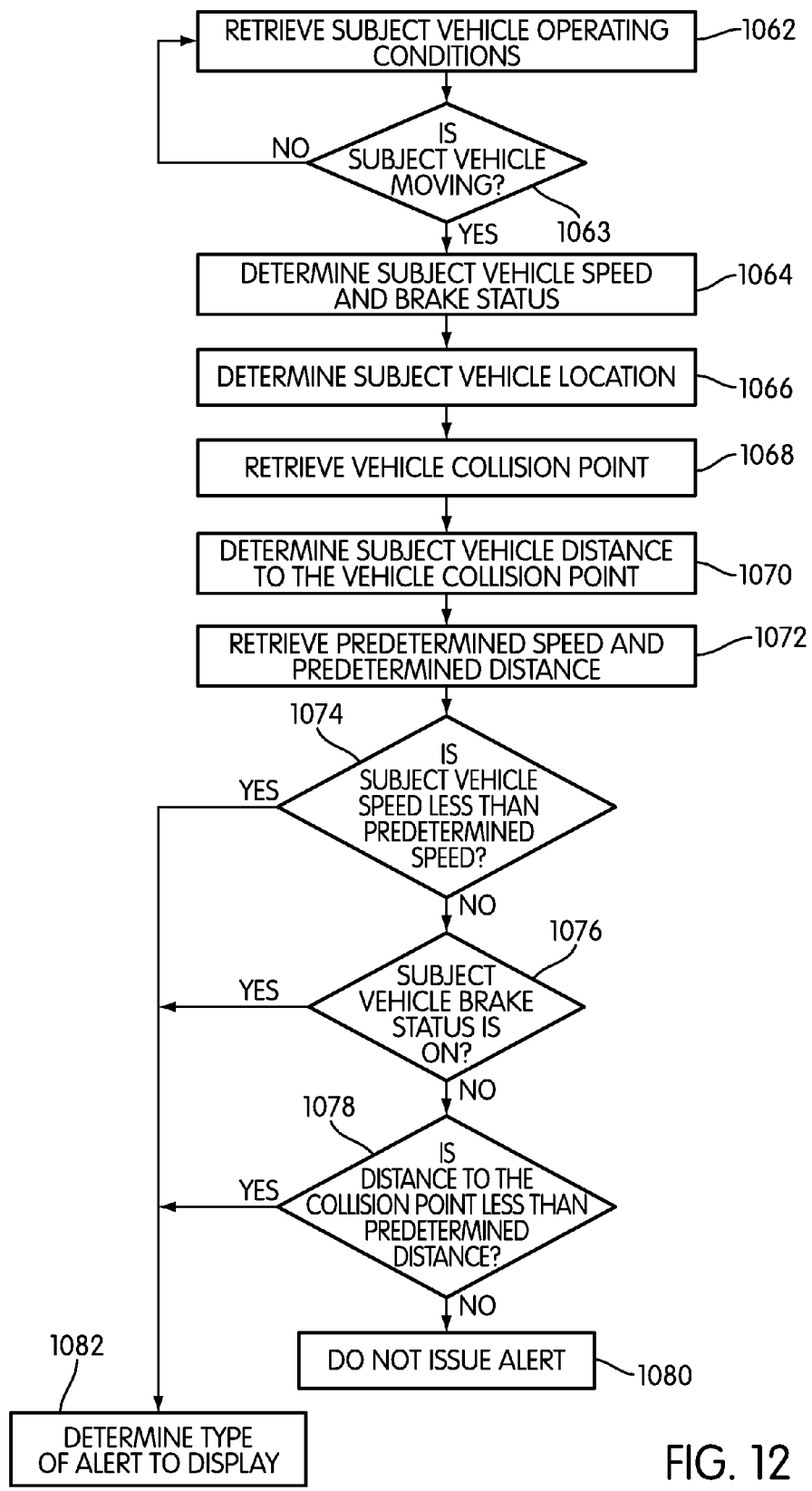
FIG. 12 is an embodiment of a process for controlling a collision warning system.

FIG. 12 illustrates an embodiment of a process for determining if any type of alert should be issued when a motor vehicle is approaching an intersection. In this embodiment, the following steps may be performed by ECU 120; however in some embodiments these steps may be performed by additional systems or devices associated with motor vehicle 102 and/or collision warning system 100. In addition, it will be understood that in other embodiments one or more of the following steps may be optional.

During first step 1062, ECU 120 may receive one or more vehicle operating conditions. As previously discussed, as ECU 120 is connected to an internal or onboard vehicle network (see FIG. 1), ECU 120 may receive information from various systems, sensors, or other devices associated with motor vehicle 102. In particular, ECU 120 may receive information from a vehicle speed sensor and a brake sensor.

Following step 1062, ECU 120 may proceed to step 1063. During step 1063, ECU 120 may determine if the subject vehicle is moving. If the subject vehicle is moving, ECU 120 may proceed to step 1064 to determine if alerts should be displayed. If, during step 1063, ECU 120 determines that the subject vehicle is not moving, ECU 120 may return back to step 1062. In other words, ECU 120 may only perform the remaining steps in the process when the vehicle is moving. In particular, if a vehicle is stopped, ECU 120 may perform the process discussed above and illustrated in FIG. 10, to determine if an alert should be issued.

During step 1064, ECU 120 can determine a vehicle speed and brake status of the subject vehicle. Following step 1064, ECU 120 may proceed to step 1066. During step 1066, ECU 120 may determine a current location. In some cases, ECU 120 may receive information form a GPS receiver to determine the current location. Next, during step 1068, ECU 120 may retrieve a vehicle collision point that has been determined during step 804 of the process discussed above.

Following step 1068, ECU 120 may determine the distance of the subject vehicle to the vehicle collision point during step 1070. In some embodiments, during step 1038, ECU 120 may determine both the subject vehicle distance and the target vehicle distance to the vehicle collision point. Following this, ECU 120 may retrieve a predetermined speed and a predetermined distance during step 1072. Generally, the predetermined speed can be any value. In some cases, the predetermined speed may be a threshold speed that is used to determine whether or not a driver intends to stop the vehicle at an intersection. In cases where the vehicle speed is above the predetermined speed, the collision warning system may not issue alerts. In addition, the predetermined distance could be a threshold distance to the vehicle collision point. In other words, if a vehicle is farther from the vehicle collision point than the predetermined distance the threat of collision may be very low. In such cases, the collision warning system may not issue alerts.

Following step 1072, ECU 120 may proceed to step 1074. During step 1044, ECU 120 may determine if the vehicle speed is less than the predetermined speed. If so, ECU 120 may proceed to step 1082, where ECU 120 determines the type of alert to display. Otherwise, ECU 120 may proceed to step 1076. During step 1076, ECU 120 may determine if the brake status of the vehicle is on. In other words, ECU 120 may determine if the subject vehicle is braking. If the vehicle is braking, ECU 120 may proceed to step 1082, otherwise ECU 120 may proceed to step 1078. With this arrangement, step 1074 and step 1076 may be used to determine if a driver has any intention of stopping the vehicle.

Following step 1076, ECU 120 may proceed to step 1078 to determine if the distance to the vehicle collision point is less than the predetermined distance. In embodiments where ECU 120 determined both a subject vehicle distance and a target vehicle distance to the vehicle collision point during step 1070, ECU 120 may determine if both the subject vehicle distance and the target vehicle distance are below the predetermined distance. In other words, ECU 120 may determine if both the subject vehicle and the target vehicle are sufficiently close to the vehicle collision point. If so, ECU 120 may proceed to step 1082, otherwise ECU 120 may proceed to step 1080. During step 1080, ECU 120 determines that no alert is necessary, since the motor vehicle is not stopping, as determined during steps 1074 and 1076. Furthermore, no alert is necessary because the vehicle is not close to a potential vehicle collision point, as determined during step 1078.

Figure 13:
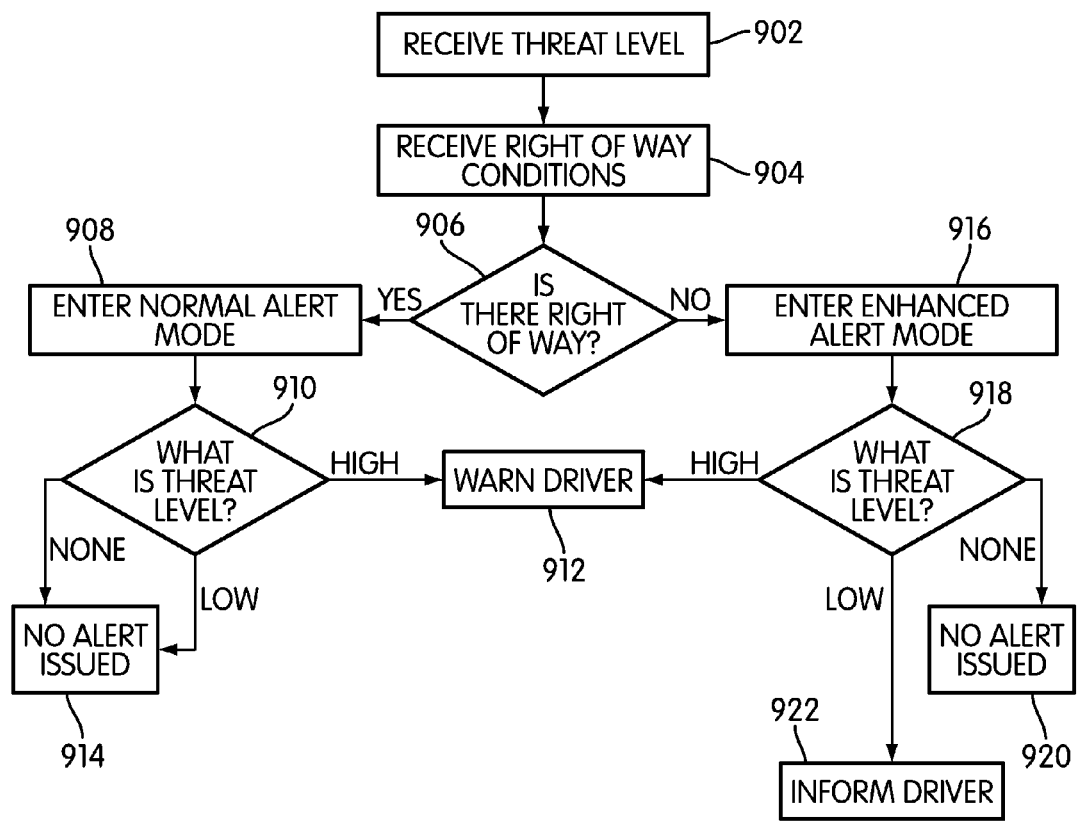
FIG. 13 is an embodiment of a process for controlling a collision warning system.

FIG. 13 illustrates an embodiment of a process for operating collision warning system 100. In this embodiment, the following steps may be performed by ECU 120; however in some embodiments these steps may be performed by additional systems or devices associated with motor vehicle 102 and/or collision warning system 100. In addition, it will be understood that in other embodiments one or more of the following steps may be optional.

During step 902, ECU 120 may receive the threat level. In some cases, the threat level may be calculated using the method discussed above. Next, ECU 120 may receive right of way conditions during step 904. In particular, ECU 120 can determine if a subject vehicle has right of way over a target vehicle.

Following step 904, ECU 120 can proceed to step 906. During step 906, ECU 120 may determine if there is right of way according to the right of way conditions received during step 904. If there is right of way, ECU 120 may proceed to step 908. During step 908, ECU 120 puts collision warning system 100 in a normal alert mode.

Following step 908, ECU 120 can proceed to step 910. During step 910, ECU 120 determines the threat level according to the threat level received during step 902. If, during step 910, ECU 120 determines that the threat level is high, ECU 120 proceeds to step 912, where a warning alert is issued. Otherwise, if ECU 120 determines that the threat level is low or that there is no threat, ECU 120 proceeds to step 914. During step 914, no alert is issued.

Returning to step 906, if ECU 120 determines that there is no right of way, ECU 120 may proceed to step 916. During step 916, ECU 120 puts collision warning system 100 in an enhanced alert mode. In particular, the enhanced alert mode is a mode of collision warning system 100 associated with a high frequency of informing alerts due to the lack of right of way.

Following step 916, ECU 120 can proceed to step 918. During step 918, ECU 120 determines the threat level according to the threat level received during step 902. If, during step 918, ECU 120 determines that there is no threat, ECU 120 proceeds to step 920, where no alert is issued. If, during step 918, ECU 120 determines that there is a low threat, ECU 120 may proceed to step 922, where an informing alert is issued. If, during step 920, ECU 120 determines that the threat level is high, ECU 120 proceeds to step 912, where a warning alert is issued.

A collision warning system can include provisions for determining right of way conditions for a motor vehicle. In some embodiments, the collision warning system can use information associated with a vehicle communication network to determine right of way conditions.

Figure 14:
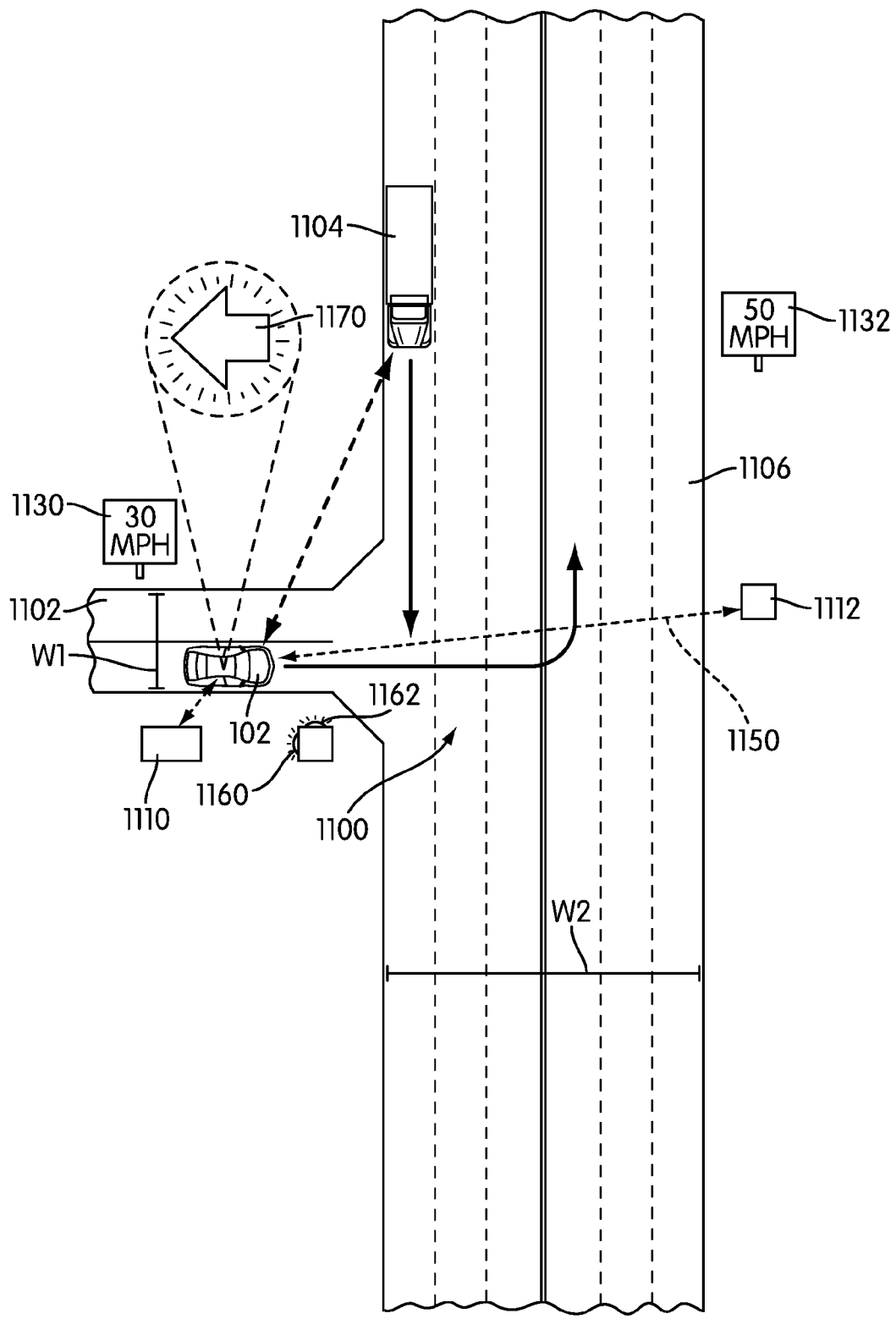
FIG. 14 is a schematic view of an embodiment of a motor vehicle approaching an intersection.

FIG. 14 illustrates an embodiment of motor vehicle 102 approaching intersection 1100. In this embodiment, motor vehicle 102 is traveling on first roadway 1102. In addition, target vehicle 1104 is approaching intersection 1100 on second roadway 1106. In the exemplary embodiment, first roadway 1102 is a substantially smaller roadway than second roadway 1106, which is illustrated as a highway.

In some embodiments, a roadway can be associated with one or more roadside units. The term "roadside unit" as used throughout this detailed description and in the claims refers to a non-vehicular node in a vehicle communication network. For example, a roadside unit may be a stationary device configured to transmit, and in some cases receive, information related to the roadway. In some cases, a roadside unit may be configured to transmit information about one or more roadway characteristics. The term "roadway characteristic" as used throughout this detailed description and in the claims refers to any information used to characterize a roadway including, but not limited to: roadway type (such as "highway" or "access road"), roadway width, number of lanes, speed limit, traffic signal information, as well as other roadway information. In addition, in some embodiments, a roadside unit may be configured to transmit information related to basic safety messages (BSM) or any other type of information that can be exchanged using a vehicle communication network.

In the exemplary embodiment, first roadway 1102 is associated with first roadside unit 1110. In some cases, first roadside unit 1110 may be configured to transmit information related to first roadway 1102. In addition, second roadway 1106 is associated with second roadside unit 1112. In some cases, second roadside unit 1112 may be configured to transmit information related to second roadway 1106. Furthermore, motor vehicle 102 can be in communication with first roadside unit 1110 and second roadside unit 1112 using vehicle communication network 1150. With this arrangement, motor vehicle 102 can be configured to receive information about first roadway 1102 and second roadway 1106.

In different embodiments, first roadside unit 1110 and second roadside unit 1112 can be located in various places. For purposes of illustration, first roadside unit 1110 and second roadside unit 1112 are illustrated as located close to intersection 1100. However, in other embodiments, first roadside unit 1110 and second roadside unit 1112 can be located at other locations. In addition, it is not necessary for a roadside unit that is associated with a particular roadway to be located on or near that roadway. A roadside unit can be placed in any location such that a motor vehicle driving on the associated roadway can receive information from the roadside unit.

Furthermore, while two distinct roadside units are used in the exemplary embodiment, other embodiments could include a different number of roadside units. For example, in some embodiments a single roadside unit can be used for transmitting information related to two or more roadways. Also, in some embodiments, two or more roadside units can be used to transmit information related to a single roadway.

A collision warning system can include provisions for determining right of way conditions for a motor vehicle according to various roadway characteristics. In some cases, a collision warning system can retrieve values for a particular roadway characteristic associated with two intersecting roads. By comparing the values of the two roadway characteristics, the collision warning system can determine if vehicles traveling on one of the two intersecting roadways may be given right of way.

In one embodiment, a collision warning system can include provisions for determining right of way conditions using speed limit information. In some cases, a collision warning system can retrieve speed limits for two intersecting roadways. Since vehicles traveling on roadways with higher speed limits are typically given right of way over vehicles on roadways with lower speed limits, the collision warning system can determine right of way conditions by comparing the speed limits for the intersecting roadways.

In one embodiment, motor vehicle 102 can receive information about first speed limit 1130 and second speed limit 1132 from first roadside unit 1110 and second roadside unit 1112, respectively. In the current embodiment, first speed limit 1130 of first roadway 1102 is associated with a speed of 30 miles per hour, while second speed limit 1132 of second roadway 1106 is associated with a speed of 50 miles per hour. In some cases, collision warning system 100 can use this information to determine that motor vehicle 102 does not have right of way at intersection 1100, since the speed limit of first roadway 1102 is less than the speed limit of second roadway 1106. In particular, in considering whether to enter a normal alert mode or an enhanced alert mode for alerts concerning target vehicle 1104, collision warning system 100 may operate in an enhanced alert mode.

In one embodiment, a collision warning system can include provisions for determining right of way conditions using lane count information, which refers to the number of lanes comprising a roadway. In some cases, a collision warning system can retrieve lane counts for two intersecting roadways. Since vehicles traveling on roadways with a larger number of lanes are typically given right of way over vehicles traveling on roadways with a smaller number of lanes, the collision warning system can determine right of way conditions by comparing the lane counts for the intersecting roadways.

In one embodiment, motor vehicle 102 can receive information about the number of lanes comprising first roadway 1102 and second roadway 1106 from first roadside unit 1110 and second roadside unit 1112, respectively. In the current embodiment, first roadway 1102 has 2 lanes, while second roadway 1106 has 6 lanes. In some cases, collision warning system 100 can use this information to determine that motor vehicle 102 does not have right of way at intersection 1100, since first roadway 1102 has less lanes than second roadway 1106. In particular, in considering whether to enter a normal alert mode or an enhanced alert mode for alerts concerning target vehicle 1104, collision warning system 100 may operate in an enhanced alert mode.

In one embodiment, a collision warning system can include provisions for determining right of way conditions using lane width. In some cases, a collision warning system can retrieve lane widths for two intersecting roadways. Since vehicles traveling on roadways with a larger lane width are typically given right of way over vehicles traveling on roadways with smaller widths, the collision warning system can determine right of way conditions by comparing the lane widths for the intersecting roadways.

In one embodiment, motor vehicle 102 can receive information about width W1 of first roadway 1102 and width W2 of second roadway 1106 from first roadside unit 1110 and second roadside unit 1112, respectively. In this case, width W2 is substantially larger than width W1. In some cases, collision warning system 100 can use this information to determine that motor vehicle 102 does not have right of way at intersection 1100, since second roadway 1106 is substantially wider than first roadway 1102. In particular, in considering whether to enter a normal alert mode or an enhanced alert mode for alerts concerning target vehicle 1104, collision warning system 100 may operate in an enhanced alert mode.

In one embodiment, a collision warning system can include provisions for determining right of way conditions using information related to traffic signal phase length. The term "traffic signal phase length" as used throughout this detailed description and in the claims refers to the length of time that a traffic signal stays in a green light condition. In some cases, a collision warning system can retrieve traffic signal phase lengths associated with traffic signals of two intersecting roadways. Since vehicles traveling on roadways with a longer traffic signal phase length are typically given right of way, the collision warning system can determine right of way conditions by comparing the traffic signal phase lengths of the intersecting roadways.

In one embodiment, motor vehicle 102 can receive information about the traffic signal phase lengths of first traffic signal 1160 and second traffic signal 1162 that are associated with first roadway 1102 and second roadway 1106, respectively. In particular, motor vehicle 102 can receive the traffic signal phase lengths from first roadside unit 1110 and/or second roadside unit 1112. In the current embodiment, first traffic signal 1160 may have a traffic signal phase length of approximately 20 seconds, while second traffic signal 1162 may have a traffic signal phase length of approximately 40 seconds. In some cases, collision warning system 100 can use this information to determine that motor vehicle 102 does not have right of way at intersection 1100, since second traffic signal 1162 has a greater traffic signal phase length than first traffic signal 1160. In particular, in considering whether to enter a normal alert mode or an enhanced alert mode for alerts concerning target vehicle 1104, collision warning system 100 may operate in an enhanced alert mode.

In addition, in other embodiments, right of way conditions can be determined using other provisions. In some embodiments, the existence of one or more traffic signs can be used by a collision warning system to determine right of way conditions. In particular, a collision warning system can receive information related to the existence of a traffic sign from one or more roadside units. For example, in one embodiment, the existence of a stop sign on the roadway traveled by the subject vehicle can cause a collision warning system to determine that the subject vehicle does not have right of way. Likewise, in another embodiment, the existence of a yield sign on the roadway traveled by the subject vehicle can cause a collision warning system to determine that the subject vehicle does not have right of way.

In different embodiments, a roadway characteristic can be determined in various ways. In the embodiments discussed above, a roadside unit can be configured to transmit various information including one or more roadway characteristics for a particular roadway. In other embodiments, however, a roadway characteristic can be determined using any other provisions. For example, in some cases, a motor vehicle can be equipped with an optical sensing device such as a video camera for sensing some characteristics of a roadway including lane count, roadway width, the presence of a traffic sign, as well as other roadway characteristics. In some cases, for example, a video camera could be used to detect a speed limit sign for purposes of determining a speed limit of the roadway. In particular, a video camera could be used to capture an image of a speed limit sign and the image could be processed to extract speed limit information. In addition, in some cases, a video camera and image processing could be used to determine traveling lane information. Moreover, it will be understood that in other embodiments, any other type of camera or optical sensing device could be used to determine roadway characteristics. Furthermore, it will be understood that any type of image processing hardware and/or software could be used to extract roadway characteristic information from one or more images detected by a camera or any other type of optical sensing device.

In addition, while the embodiments discussed above utilize information retrieved primarily from a vehicle communication network, such as a DSRC network, in other embodiments a collision warning system can be configured to receive information using other provisions. For example, in some cases, a collision warning system can receive roadway information, including one or more roadway characteristics, using an RFID receiver. Furthermore, in some cases, a collision warning system can be associated with a geographic information system (GIS) type database, which may be used to associate various types of information that is linked to a specific location. In particular, by determining a current location for a subject vehicle, including the current roadway being traveled, the collision warning system can retrieve one or more roadway characteristics of the roadway using the GIS type database. Additionally, in some embodiments, roadway information could be obtained from any other type of mapping systems or databases that may or may not be GIS systems. In still other embodiments, roadway information may be obtained from a GPS system that is configured to receive various types of navigation information. In some cases, GIS information may be associated with GPS information so that roadway information can be retrieved from a GIS database according to the current location of a vehicle. Moreover, in some cases, a vehicle may include a map only database that can be used with GPS information.

Examples of roadway characteristics that may be determined from GIS information, GPS information, map only information and/or any combination of these methods include, but are not limited to: speed limit differences, lane count differences, lane width differences, traffic signal phase differences and traffic sign existence. For example, speed limit information for various roadways may be stored in a GIS database of some kind. Also, the number of lanes on various roadways may be stored in a GIS database. In addition, the width of lanes of various roadways may be stored in a GIS database. Furthermore, the traffic signal phase of traffic signals may be stored in a GIS database. Also, the presence of various types of roadway control signs (stop signs, yield signs, etc.) may be stored in a GIS database. With this arrangement, various different types of roadway information may be determined by retrieving information from one or more GIS databases that are located onboard of a subject vehicle or that may be accessed using a wireless network of some kind.

A collision warning system can include provisions to determine right of way conditions by considering operating conditions of a subject vehicle. In some embodiments, a collision warning system can determine right of way conditions using a turning status of a motor vehicle. In particular, the collision warning system can determine if the driver intends to turn left at an upcoming intersection, turn right at the upcoming intersection, or pass straight through the upcoming intersection. In cases where the driver intends to turn left, especially across oncoming traffic, the collision warning system may determine that the motor vehicle does not have right of way. In contrast, if the driver intends to pass straight through the intersection, the collision warning system may determine that the motor vehicle does have right of way.

In different embodiments, a collision warning system can determine the turning status of a motor vehicle in different ways. In some embodiments, a collision warning system can receive information related to a turning signal of a motor vehicle. For example, if a driver activates a left turning signal to indicate the intention to turn left, the collision warning system can receive information related to the turning signal and determine that the motor vehicle does not have right of way. Likewise, if no turning signal is activated, the collision warning system can receive the turning signal information and determine that the motor vehicle does have right of way. In another embodiment, a collision warning system can use information about a lane in which the motor vehicle is traveling to determine right of way conditions. For example, if the collision warning system determines that the current traveling lane is a left turn only lane, the collision warning system can determine that the motor vehicle does not have right of way. Likewise, if the collision warning system determines that the current traveling lane is a through only lane, the collision warning system can determine that the motor vehicle does have right of way.

In the exemplary embodiment illustrated in FIG. 14, motor vehicle 102 intends to turn left at intersection 1100. In this case, the driver of motor vehicle 102 has activated left turn indicator 1170. In this case, collision warning system 100 may receive information about the turning status of motor vehicle 102 from an internal or onboard vehicle network. At this point, collision warning system 100 may determine that motor vehicle 102 does not have right of way and may begin to operate in an enhanced alert mode.

Figure 15:
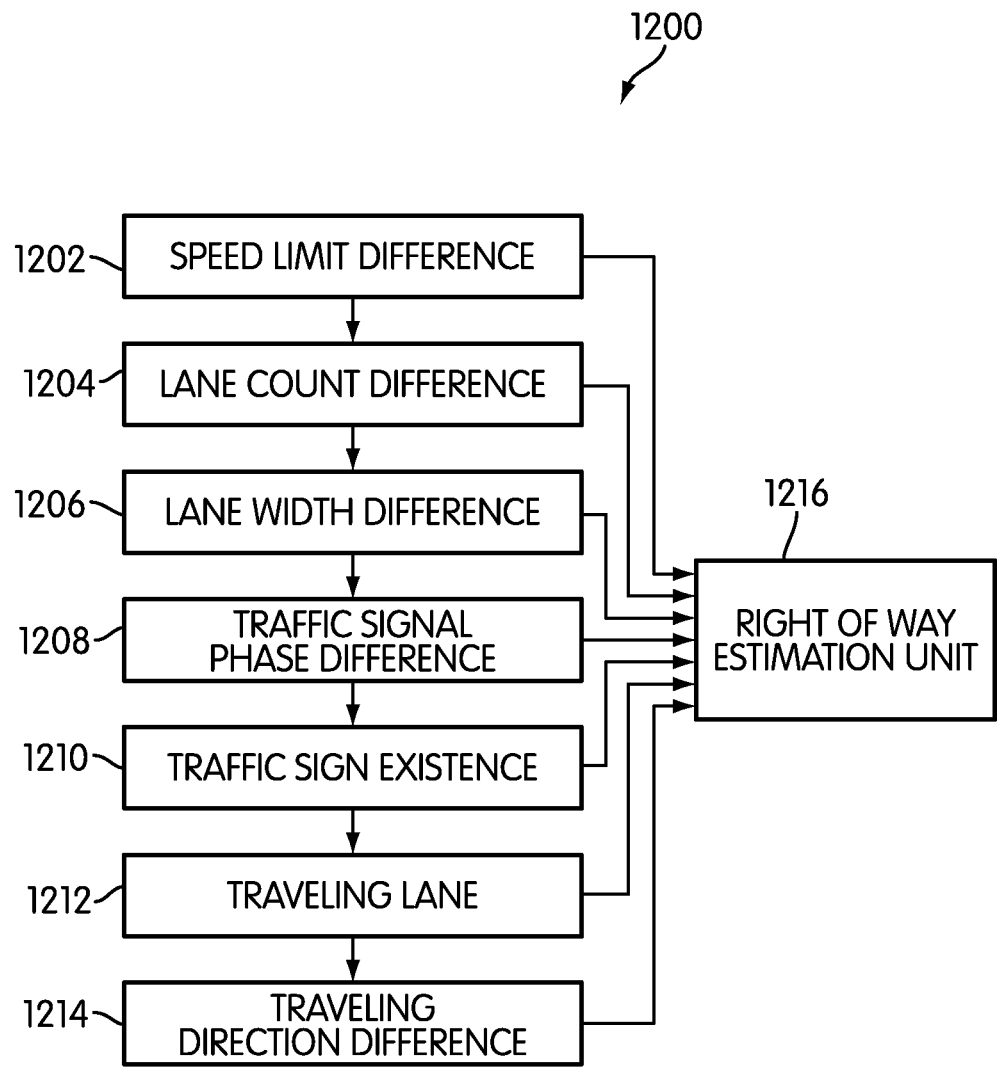
FIG. 15 is a schematic view of an embodiment of a right of way estimation system.

FIG. 15 illustrates an exemplary embodiment of right of way estimation system 1200, including a set of methods that can be used for determining right of way between a subject vehicle and a target vehicle. In some embodiments, right of way estimation system 1200 includes first method 1202, second method 1204 and third method 1206 that are associated with methods of comparing speed limit differences, lane count differences and lane width differences, respectively, of two intersecting roadways. In addition, right of way estimation system 1200 includes fourth method 1208 that is associated with comparing traffic signal phase lengths between traffic signals associated with two intersecting roadways. First method 1202, second method 1204, third method 1206 and fourth method 1208 are methods that use available roadway information to determine right of way.

In some embodiments, right of way estimation system 1200 may also include fifth method 1210 that involves checking for the existence of a traffic sign, such as a stop sign or a yield sign. Also, right of way estimation system 1200 can include sixth method 1212 that involves checking the traveling lanes of the subject vehicle and the target vehicle to determine right of way. In particular, the traveling lane may be useful for determining if the subject vehicle and/or the target vehicle are planning to turn left, pass straight through, or turn right at the intersection. This information can be useful for estimating right of way for a subject vehicle. In addition, right of way estimation system 1200 can include seventh method 1214 that is associated with comparing the traveling direction of a subject vehicle and a target vehicle to determine right of way. In particular, right of way can be estimated according to whether the subject vehicle is planning to turn left, pass straight through, or turn right at an intersection. In this case, sixth method 1212 and seventh method 1214 may be methods that use operating conditions of a motor vehicle to determine right of way.

In this embodiment, first method 1202, second method 1204, third method 1206, fourth method 1208, fifth method 1210, sixth method 1212 and seventh method 1214 are illustrated as inputs to right of way estimation unit 1216. Generally, right of way estimation unit 1216 may be any routine utilized by an ECU for purposes of estimating right of way. In some cases, right of way estimation unit 1216 may be a function. In other cases, right of way estimation unit 1216 may be associated with one or more programs.

Generally, any combination of input methods can be used. In some cases, only a single method may be used for estimating right of way. In other cases, more than one method can be used for estimating right of way. For example, in another embodiment, a right of way estimation system may utilize both speed limit differences and lane count differences in determining right of way conditions. In still other cases, all seven methods discussed here can be used for estimating right of way. In some embodiments, it may be useful to use multiple methods, since some methods may be less accurate than others. In addition, in situations where roadway characteristics of two roadways are equal, right of way may not be determined. Therefore, a collision warning system can help increase the accuracy of a right of way estimation system by utilizing several methods for determining right of way simultaneously.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method of operating a collision warning system in a motor vehicle, comprising the steps of:
   receiving information related to a target vehicle;
   determining if the motor vehicle has right of way over the target vehicle;
   the collision warning system including multiple alert modes;
   operating the collision warning system in a normal alert mode when the motor vehicle has right of way over the target vehicle;
   operating the collision warning system in an enhanced alert mode when the target vehicle has right of way over the motor vehicle;
   wherein the normal alert mode is different than the enhanced alert mode;
   wherein the normal alert mode includes a warning alert, the warning alert being associated with a serious threat of collision; and
   wherein the enhanced alert mode includes the warning alert and an informing alert, the informing alert being associated with a potential threat to the motor vehicle.

2. The method according to claim 1, wherein the method of determining if the motor vehicle has right of way over the target vehicle further includes the steps of:
   receiving information related to a first roadway associated with the motor vehicle and receiving information related to a second roadway associated with the target vehicle;
   determining a first roadway characteristic from the information related to the first roadway and a second roadway characteristic from the information related to the second roadway;
   comparing the first roadway characteristic with the second roadway characteristic; and
   determining a right of way condition of the motor vehicle.

3. The method according to claim 1, wherein the step of operating the collision warning system further includes the steps of:
   determining that the collision warning system is operating in the normal alert mode;
   calculating a threat level, the threat level being associated with a threat of collision between the motor vehicle and the target vehicle and wherein the threat level is associated with a first threat level and a second threat level that is higher than the first threat level;
   issuing the warning alert when the threat level is the second threat level; and
   issuing no alert when the threat level is the first threat level.

4. The method according to claim 1, wherein the step of operating the collision warning system further includes the steps of:
   determining that the collision warning system is operating in the enhanced alert mode;
   calculating a threat level, the threat level being associated with a threat of collision between the motor vehicle and the target vehicle and wherein the threat level is associated with a first threat level and a second threat level that is higher than the first threat level;
   issuing the warning alert when the threat level is the second threat level; and
   issuing the informing alert when the threat level is the first threat level.

5. The method according to claim 1, wherein the step of receiving information from the target vehicle includes a step of receiving information about a traffic sign and wherein the motor vehicle has right of way over the target vehicle when the motor vehicle encounters a traffic sign at an intersection.

6. The method according to claim 1, wherein the step of receiving information from the target vehicle includes a step of receiving information about a turning status of a motor vehicle and wherein the motor vehicle has right of way over the target vehicle when the motor vehicle is turning right.

7. The method according to claim 6, wherein the motor vehicle has right of way over the target vehicle when the motor vehicle is not turning.

8. The method according to claim 6, wherein the motor vehicle does not have right of way over the target vehicle when the motor vehicle is turning left.

9. A method of operating a collision warning system in a motor vehicle, comprising the steps of:
   receiving information related to a first roadway associated with the motor vehicle and receiving information related to a second roadway associated with a target vehicle;

determining a first roadway characteristic from the information related to the first roadway and a second roadway characteristic from the information related to the second roadway;
comparing the first roadway characteristic with the second roadway characteristic;
determining a right of way condition of the motor vehicle;
operating the collision warning system in a normal alert mode when the motor vehicle has right of way over the target vehicle;
operating the collision warning system in an enhanced alert mode when the target vehicle has right of way over the motor vehicle; and
wherein the normal alert mode is different than the enhanced alert mode;
wherein the normal alert mode includes a warning alert, the warning alert being associated with a serious threat of collision; and
wherein the enhanced alert mode includes the warning alert and an informing alert, the informing alert being associated with a potential threat to the motor vehicle.

10. The method according to claim 9, wherein the first roadway characteristic is a first speed limit of the first roadway and wherein the second roadway characteristic is a second speed limit of the second roadway and wherein the motor vehicle is determined to have right of way over the target vehicle when the first speed limit is greater than the second speed limit.

11. The method according to claim 9, wherein the first roadway characteristic is a first lane count of the first roadway and wherein the second roadway characteristic is a second lane count of the second roadway and wherein the motor vehicle is determined to have right of way over the target vehicle when the first lane count is greater than the second lane count.

12. The method according to claim 9, wherein the first roadway characteristic is a first lane width of the first roadway and wherein the second roadway characteristic is a second lane width of the second roadway and wherein the motor vehicle is determined to have right of way over the target vehicle when the first lane width is greater than the second lane width.

13. The method according to claim 9, wherein the first roadway characteristic is a first traffic signal phase length of the first roadway and wherein the second roadway characteristic is a second traffic signal phase length of the second roadway and wherein the motor vehicle is determined to have right of way over the target vehicle when the first traffic signal phase length is greater than the second traffic signal phase length.

14. The method according to claim 9, wherein the number of alerts issued in the enhanced alert mode is greater than the number of alerts issued in the normal alert mode.

15. The method according to claim 9, wherein the collision warning system issues only warning alerts in the normal alert mode and wherein the collision warning system prevents informing alerts in the normal alert mode.

16. A method of operating a collision warning system in a motor vehicle, comprising the steps of:
receiving information related to a target vehicle;
determining if the motor vehicle has right of way over the target vehicle;
the collision warning system including multiple alert modes;
operating the collision warning system in a normal alert mode when the motor vehicle has right of way over the target vehicle;
operating the collision warning system in an enhanced alert mode when the target vehicle has right of way over the motor vehicle;
wherein the collision warning system issues more alerts in the enhanced alert mode than in the normal alert mode;
wherein the normal alert mode includes a warninq alert, the warninq alert being associated with a serious threat of collision; and
wherein the enhanced alert mode includes the warninq alert and an informinq alert, the informinq alert being associated with a potential threat to the motor vehicle.

17. The method according to claim 16, wherein the collision warning system prevents alerts from being issued when the motor vehicle is substantially stopped.

18. The method according to claim 17, wherein the collision warning system prevents the informing alert from being issued in the normal alert mode.

19. The method according to claim 18, wherein the collision warning system can send one or more informing alerts and warning alerts in the enhanced alert mode.

20. The method according to claim 16,
wherein the step of operating the collision warninq system further includes the steps of:
determining that the collision warninq system is operating in the enhanced alert mode;
calculating a threat level, the threat level being associated with a threat of collision between the motor vehicle and the target vehicle and wherein the threat level is associated with a first threat level and a second threat level that is higher than the first threat level;
issuinq the warning alert when the threat level is the second threat level; and
issuing the informing alert when the threat level is the first threat level.

* * * * *